US012750663B1

(12) United States Patent
Oleszczak et al.

(10) Patent No.: US 12,750,663 B1
(45) Date of Patent: Sep. 29, 2026

(54) SYSTEMS AND METHODS FOR CONSENT CAPTURE VIA A MOBILE DEVICE

(71) Applicant: WELLS FARGO BANK, N.A., San Francisco, CA (US)

(72) Inventors: Jacek Oleszczak, San Francisco, CA (US); James Oliver, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 17/379,706

(22) Filed: Jul. 19, 2021

(51) Int. Cl.
*H04W 12/06* (2021.01)

(52) U.S. Cl.
CPC .................................. *H04W 12/06* (2013.01)

(58) Field of Classification Search
CPC .................................................... H04W 12/06
See application file for complete search history.

(56) References Cited

U.S. PATENT DOCUMENTS

| | | | |
|---|---|---|---|
| 7,766,223 | B1 | 8/2010 | Mello et al. |
| 7,844,519 | B2 | 11/2010 | Wehunt et al. |
| 8,141,134 | B2 | 3/2012 | Brandt et al. |
| 8,295,898 | B2 | 10/2012 | Ashfield et al. |
| 8,306,914 | B2 | 11/2012 | Johns et al. |
| 8,341,712 | B2 | 12/2012 | Machani |
| 8,402,115 | B2 | 3/2013 | Franco et al. |
| 8,417,614 | B1 | 4/2013 | Mackrell et al. |
| 8,468,090 | B2 | 6/2013 | Lesandro et al. |
| 8,555,355 | B2 | 10/2013 | Rathbun |

(Continued)

FOREIGN PATENT DOCUMENTS

| | | | |
|---|---|---|---|
| CA | 2849815 | A1 | 4/2013 |
| CA | 2853559 | A1 | 4/2013 |

(Continued)

OTHER PUBLICATIONS

A. Lakshminarayanan, "TAP—practical security protocols for wireless personal devices," 2004 IEEE 15th International Symposium on Personal, Indoor and Mobile Radio Communications (IEEE Cat. No. 04TH8754), Barcelona, 2004, pp. 2884-2888 vol. 4. (Year: 2004).

(Continued)

*Primary Examiner* — Meng Li
*Assistant Examiner* — Lydia L Noel
(74) *Attorney, Agent, or Firm* — Foley & Lardner LLP

(57) ABSTRACT

Systems and methods for capturing consent via mobile device are described herein. A computer system associated with an institution receives a request for a consent session from an agent terminal. Responsive to the request, the computer system initiates a consent session and transmits a consent request notification to a mobile device associated with a customer of the institution. Based on the customer's selection of the notification, the computer system receives authentication information associated with the customer from the mobile device. Upon authenticating the consent session, the computer system receives a consent decision from the mobile device. The computer system stores a record of the consent decision in a consent databases. The computer system transmits a customized visit summary to the mobile device, the customized visit summary comprising the record of the consent decision.

20 Claims, 6 Drawing Sheets

(56) References Cited

U.S. PATENT DOCUMENTS

| | | | | |
|---|---|---|---|---|
| 8,651,373 | B1 | 2/2014 | Block et al. | |
| 8,700,527 | B2 | 4/2014 | Dolphin et al. | |
| 9,275,360 | B2 | 3/2016 | He et al. | |
| 9,503,526 | B2 | 11/2016 | Daoud et al. | |
| 9,640,040 | B2 | 5/2017 | Irudayam et al. | |
| 9,760,871 | B1 | 9/2017 | Pourfallah et al. | |
| 9,875,470 | B2 | 1/2018 | Killoran | |
| 9,930,046 | B2 | 3/2018 | Choe et al. | |
| 10,032,168 | B2 | 7/2018 | Kulkarni et al. | |
| 10,163,153 | B1 | 12/2018 | Constantine et al. | |
| 10,529,015 | B1 | 1/2020 | Hill et al. | |
| 10,546,325 | B2 | 1/2020 | Friborg, Jr. | |
| 10,878,495 | B1 | 12/2020 | Hill et al. | |
| 11,201,866 | B1 * | 12/2021 | Specht | H04L 63/1425 |
| 11,354,732 | B1 | 6/2022 | Hill et al. | |
| 11,669,895 | B1 | 6/2023 | Chawla et al. | |
| 11,687,997 | B2 | 6/2023 | Girish et al. | |
| 11,694,256 | B1 | 7/2023 | Hill et al. | |
| 2002/0007343 | A1 | 1/2002 | Oyama et al. | |
| 2002/0123948 | A1 | 9/2002 | Yumoto | |
| 2003/0139994 | A1 | 7/2003 | Jones | |
| 2005/0108080 | A1 | 5/2005 | Peterson | |
| 2005/0108083 | A1 | 5/2005 | Peterson | |
| 2006/0116898 | A1 | 6/2006 | Peterson | |
| 2006/0143107 | A1 | 6/2006 | Dumas et al. | |
| 2007/0061254 | A1 | 3/2007 | Blunck et al. | |
| 2007/0081649 | A1 | 4/2007 | Baudino et al. | |
| 2007/0088952 | A1 | 4/2007 | Hewitt et al. | |
| 2008/0010215 | A1 | 1/2008 | Rackley, III et al. | |
| 2008/0070593 | A1 | 3/2008 | Altman et al. | |
| 2008/0108324 | A1 | 5/2008 | Moshir et al. | |
| 2008/0109370 | A1 | 5/2008 | Moshir et al. | |
| 2008/0133930 | A1 | 6/2008 | Moshir et al. | |
| 2008/0189185 | A1 | 8/2008 | Matsuo et al. | |
| 2010/0222037 | A1 | 9/2010 | Dragt | |
| 2010/0241535 | A1 | 9/2010 | Nightengale et al. | |
| 2010/0287606 | A1 | 11/2010 | Machani | |
| 2011/0004550 | A1 | 1/2011 | Giordano et al. | |
| 2011/0099067 | A1 | 4/2011 | Cooper et al. | |
| 2011/0166992 | A1 | 7/2011 | Dessert et al. | |
| 2011/0208603 | A1 | 8/2011 | Benefield et al. | |
| 2011/0208629 | A1 | 8/2011 | Benefield et al. | |
| 2011/0213658 | A1 | 9/2011 | Joa et al. | |
| 2011/0237222 | A1 * | 9/2011 | Niejadlik | H04L 63/10 455/411 |
| 2011/0276396 | A1 | 11/2011 | Rathod | |
| 2012/0054095 | A1 | 3/2012 | Lesandro et al. | |
| 2012/0059757 | A1 | 3/2012 | Hurwitz et al. | |
| 2012/0078735 | A1 | 3/2012 | Bauer et al. | |
| 2012/0109821 | A1 | 5/2012 | Barbour et al. | |
| 2012/0136781 | A1 | 5/2012 | Fridman et al. | |
| 2012/0191598 | A1 | 7/2012 | Marzo et al. | |
| 2012/0216292 | A1 | 8/2012 | Richardson et al. | |
| 2012/0232968 | A1 | 9/2012 | Calman et al. | |
| 2012/0233066 | A1 | 9/2012 | Vallabhaneni | |
| 2012/0253852 | A1 | 10/2012 | Pourfallah et al. | |
| 2012/0310692 | A1 | 12/2012 | Maiya et al. | |
| 2012/0316992 | A1 | 12/2012 | Oborne | |
| 2012/0330830 | A1 | 12/2012 | Mason et al. | |
| 2013/0012159 | A1 | 1/2013 | Lodeweyckx | |
| 2013/0019013 | A1 | 1/2013 | Rice et al. | |
| 2013/0041817 | A1 | 2/2013 | Greenwald et al. | |
| 2013/0046634 | A1 | 2/2013 | Grigg et al. | |
| 2013/0054422 | A1 | 2/2013 | Desouza et al. | |
| 2013/0054468 | A1 | 2/2013 | Fuentes et al. | |
| 2013/0065526 | A1 | 3/2013 | Pottier et al. | |
| 2013/0144738 | A1 | 6/2013 | Qawami et al. | |
| 2013/0151064 | A1 | 6/2013 | Becker et al. | |
| 2013/0275192 | A1 | 10/2013 | Aissa | |
| 2013/0282459 | A1 | 10/2013 | Smets et al. | |
| 2013/0282565 | A1 | 10/2013 | Barta et al. | |
| 2014/0012739 | A1 | 1/2014 | Wall et al. | |
| 2014/0019352 | A1 | 1/2014 | Shrivastava | |
| 2014/0046830 | A1 | 2/2014 | Orozco et al. | |
| 2014/0061299 | A1 | 3/2014 | Scipioni | |
| 2014/0156525 | A1 | 6/2014 | Grigg | |
| 2015/0039452 | A1 | 2/2015 | Barve et al. | |
| 2015/0222615 | A1 | 8/2015 | Allain et al. | |
| 2015/0288702 | A1 | 10/2015 | Choe et al. | |
| 2016/0063435 | A1 | 3/2016 | Shah et al. | |
| 2016/0078430 | A1 | 3/2016 | Douglas et al. | |
| 2016/0125409 | A1 | 5/2016 | Meredith et al. | |
| 2016/0132960 | A1 | 5/2016 | Roberts et al. | |
| 2016/0357716 | A1 * | 12/2016 | Douglas | G06F 16/22 |
| 2017/0344991 | A1 | 11/2017 | Mark et al. | |
| 2018/0053011 | A1 * | 2/2018 | East | G16H 40/67 |
| 2019/0007525 | A1 * | 1/2019 | Smith, II | H04L 63/166 |
| 2019/0087892 | A1 * | 3/2019 | Pinski | G06Q 40/02 |
| 2019/0158434 | A1 | 5/2019 | Bhatt et al. | |
| 2019/0340679 | A1 | 11/2019 | Girish et al. | |
| 2020/0125247 | A1 | 4/2020 | Benkreira et al. | |
| 2020/0219095 | A1 | 7/2020 | Moore et al. | |
| 2021/0051148 | A1 * | 2/2021 | Parikh | H04L 67/141 |
| 2021/0058383 | A1 | 2/2021 | Colon et al. | |
| 2021/0119992 | A1 * | 4/2021 | Johnson | H04N 21/835 |
| 2021/0192081 | A1 * | 6/2021 | Brannon | H04L 67/02 |
| 2022/0083995 | A1 | 3/2022 | Flowers et al. | |
| 2022/0108309 | A1 * | 4/2022 | Hosp | G06Q 20/3263 |
| 2022/0131871 | A1 * | 4/2022 | Huang | H04W 12/06 |
| 2022/0188835 | A1 * | 6/2022 | Mashologu | G06F 16/27 |
| 2022/0277306 | A1 | 9/2022 | Levitt et al. | |
| 2022/0386067 | A1 * | 12/2022 | Donaire | H04W 4/021 |
| 2023/0128845 | A1 | 4/2023 | Brodsky et al. | |
| 2023/0247102 | A1 | 8/2023 | Bessiere et al. | |
| 2023/0274341 | A1 | 8/2023 | Girish et al. | |
| 2023/0351095 | A1 | 11/2023 | Deize et al. | |
| 2024/0012701 | A1 | 1/2024 | Gamus et al. | |

FOREIGN PATENT DOCUMENTS

| | | | | |
|---|---|---|---|---|
| CA | 3213499 | A1 | 4/2024 | |
| KR | 2013105951 | A * | 9/2013 | G06Q 20/40 |
| WO | WO-2015/054818 | A1 | 4/2015 | |

OTHER PUBLICATIONS

Ciurea, Cristian, “The Development of a Mobile Application in a Collaborative Banking System”, Informatica Economica, vol. 14, No. 3, 2010, pp. 86-97.

J. Suomalainen, “Smartphone assisted security pairings for the Internet of Things,” 2014 4th International Conference on Wireless Communications, Vehicular Technology, Information Theory and Aerospace & Electronic Systems (VITAE), Aalborg, 2014, pp. 1-5. (Year: 2014).

NFC Forum & Bluetooth Sig, Inc., Bluetooth Secure Simple Pairing Using NFC, Application Document, NFC Forum, Jan. 9, 2014, 39 pages.

Parno et al., “Phoolproof Phishing Prevention”, CyLab, Dec. 3, 2005, 16 pages.

* cited by examiner

SYSTEMS AND METHODS FOR CONSENT CAPTURE VIA A MOBILE DEVICE

TECHNICAL FIELD

The present disclosure relates to systems and methods for obtaining digital consent of a customer/user for various services.

BACKGROUND

Customers of various institutions, namely patrons of a financial institution, regularly need to perform account maintenance services to ensure that contact information and other account information or preferences remain accurate and up to date. When the customer visits a brick and mortar location associated with the institution to perform account maintenance services, the customer may be required to provide an indication of consent for such services. In order to provide the requisite consent for various services, the customer typically must sign or initial a shared personal identification number (PIN) pad device or provide a wet signature by pen and paper. However, the PIN pad and wet signature methods of obtaining consent may undesirably require consumers to share public devices (e.g., a PIN pad), may make review of account information, terms, or other pertinent information cumbersome, and may create difficulties in maintaining records of the consumers' consent decisions, etc.

SUMMARY

One example embodiment relates to a computing system for capturing consent via a mobile device. The computing system comprises an agent terminal and a provider institution computing system comprising a network interface and a processing circuit. The network interface is structured to facilitate communication with the agent terminal and with a mobile device associated with a customer. The processing circuit comprises a processor and a memory and is structured to receive a request from the agent terminal to initiate a consent session for the customer and transmit a notification to the mobile device, where the notification is configured to initiate the consent session. The processing circuit is further structured to receive authentication information from the mobile device, where the authentication information is associated with the customer. Additionally, the processing circuit is structured to authenticate the consent session based on the received authentication information, present a consent display screen to the mobile device, receive a consent decision from the mobile device, and store a record associated with the consent decision in a consent database. The processing circuit is further structured to transmit a customized visit summary to the mobile device, where the summary comprises the consent record.

Another example embodiment relates to a method of capturing consent via a mobile device. The method comprises receiving, by a provider institution computing system, a request for a consent session from an agent terminal. Additionally, the method comprises transmitting, by the provider institution computing system, a notification to a mobile device associated with a customer, where the notification is configured to initiate a consent session on the mobile device. The method further comprises receiving, by the provider institution computing system, authentication information from the mobile device, where the authentication information is associated with the customer. Furthermore, the method comprises presenting, by the provider institution computing system, a consent display screen on a display device of the mobile device and receiving, by the provider institution computing system, a consent decision from the mobile device. The method also includes storing, by the provider institution computing system, a record of the consent decision in a consent database. Finally the method includes transmitting, by the provider institution computing system, a customized visit summary to the mobile device, where the customized visit summary comprises the consent record.

A further example embodiment relates to a non-transitory computer readable medium having computer-executable instructions embodied therein that, when executed by at least one processor of a computing system, cause the computing system to perform operations to capture consent via a mobile device. The operations include: receiving a request for a consent session from an agent terminal and transmitting a notification to a mobile device associated with a customer. The notification is configured to initiate a consent session on the mobile device. The operations further include receiving authentication information from the mobile device, where the authentication information is associated with the customer. Additionally, the operations include presenting a consent display screen on a display device of the mobile device, receiving a consent decision from the mobile device, storing a record of the consent decision in a consent database, and transmitting a customized visit summary to the mobile device. The customized visit summary comprises the consent record.

BRIEF DESCRIPTION OF THE FIGURES

The details of one or more implementations are set forth in the accompanying figures and the description below. Other features, aspects, and advantages of the disclosure will become apparent from the description, the drawings, and the claims, in which:

DETAILED DESCRIPTION

Figure 1:
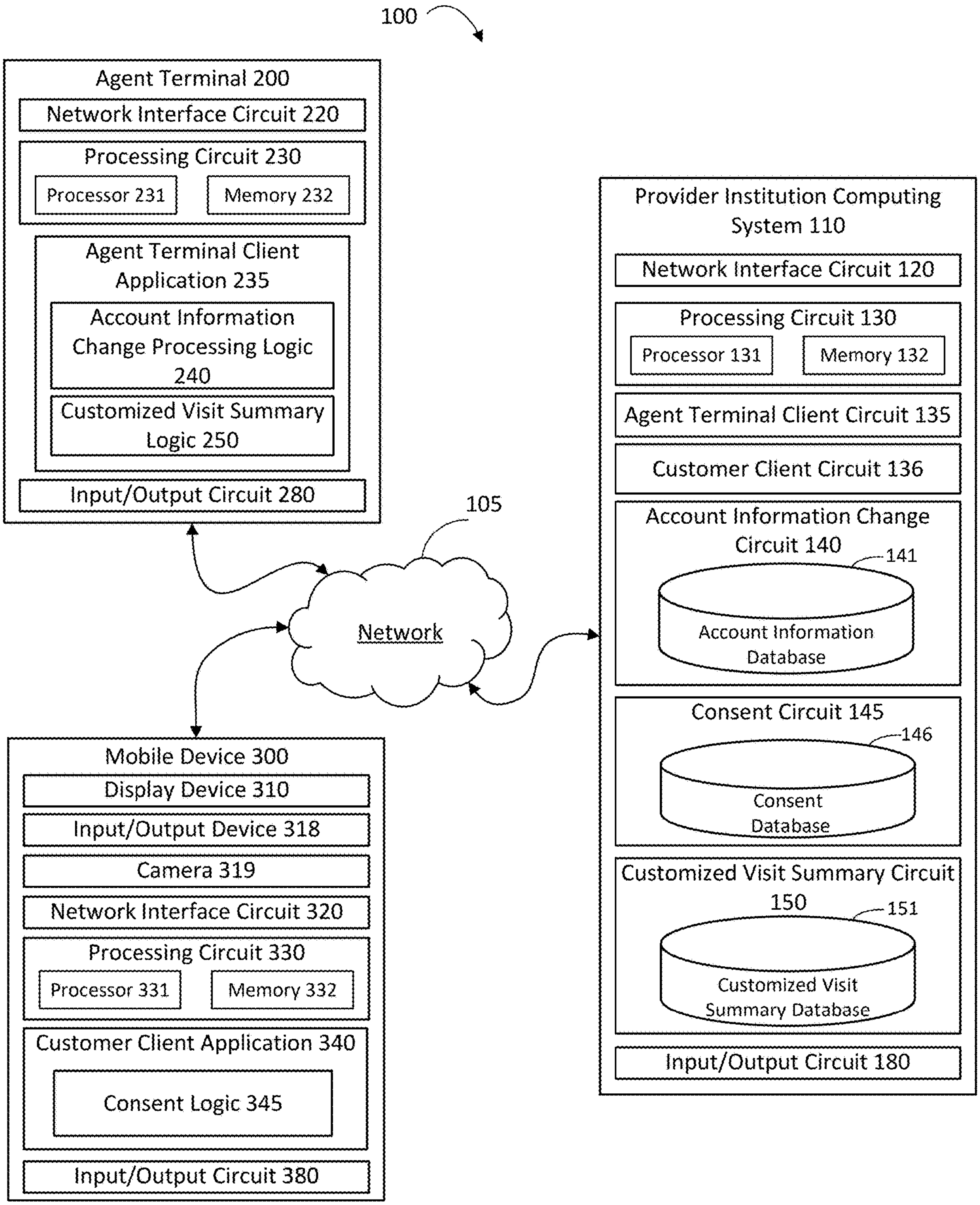
FIG. 1 is a schematic diagram of a consent capture computing system, according to an example embodiment.

Referring generally to the Figures, systems and methods for capturing consent with a computing device (e.g., a mobile device) are disclosed according to various embodiments herein. The systems and methods described herein enhance the capturing (e.g., acquisition, reception, etc.) of consent of a user for performing various services/actions, such as making account information changes. For example, the systems and methods described herein may enhance the capture of consent relating to the processing of account information changes associated with a customer of a provider institution, such as a financial institution. As described herein, the consent capture process may utilize a mobile device of the customer to provide consent for account information changes. Rather than capture a customer's consent for account information changes using a PIN pad or other shared device at a physical (i.e., brick and mortar) location of the provider institution, the systems and methods described herein permit a customer to provide consent via a private device or device otherwise associated with a customer (i.e., the customer's own mobile device). The systems and methods also provide a means of securely storing and accessing records of the captured consent in a consent database. In addition, the consent capture systems and methods facilitate the creation and distribution of a customized visit report summarizing the consent decision and associated services performed.

The systems and methods described herein improve upon consent capture processes by permitting a mobile device to be used in place of traditional consent capture mechanisms (e.g., PIN pad, paper, etc.), thereby providing a uniform, secure, transparent, and centralized consent capture system and method. Specifically, the systems and methods described herein provide specific processes for capturing, recording, and monitoring consent capture activities consistently and across a variety of applications or in relation to a variety of products or services. Because a mobile device is used in place of a PIN pad or paper, a customer's identity can be authenticated using the customer's account credentials, biometric information, two-factor authentication, or some other authentication means, thereby making the consent capture process more secure. Likewise, by capturing consent via a mobile device, the consent can be readily captured in a digital medium and stored in a central consent database, where records of consent decisions can be accessed in a single location. In addition, because consent is captured in a digital medium, access to the records of consent decisions and other information associated with the records of consent decisions is streamlined and simplified. Moreover, the interaction of multiple computing devices (e.g., mobile device, provider institution computing system, and agent terminal) in a dynamic manner provides a particular way to achieve a customer's consent in a way that improves communications amongst these multiple computing devices for a specific purpose. A unique communication method and collaboration is described herein to obtain a customer's consent. Finally, the systems and methods described herein utilize mobile devices to reduce the need for customers of a provider institution to use or handle public, common, or shared devices such as a PIN pad or pen as is typically required. Instead, customers are permitted to use their personal, private mobile device, which minimizes the spread of various surface-borne infectious diseases and bolsters hygiene generally.

In an example illustrative scenario, the consent capture systems and methods may prompt a customer of a provider institution to provide consent for account information changes. During a provider institution session, an agent associated with the provider institution may perform an account information change operation to alter, revise, create, or update account information associated with the customer. Pursuant to the customer's request, the agent may affect the account information change via an agent terminal using a prompt generated by a provider institution computing system associated with the provider institution. Once the account information has been altered, the agent may indicate via the agent terminal that the account information has been changed and that the customer's consent for the change is required. The provider institution computing system may then prompt the customer to provide consent for the account information changes by transmitting a consent request notification (e.g., text message, push notification, email, etc.) to a mobile device associated with the customer. The customer may then begin a consent session for providing consent for the account information change or withholding consent for the change. The consent session may be initiated on the mobile device by, for example, clicking a link associated with the consent request notification and providing customer authentication information as necessary. Once the consent session is authenticated, the mobile device may display a consent display screen. The consent screen may present the customer with updated account information in accordance with the customer's request regarding account information changes. The screen may further display selectable inputs to either confirm or decline the account information change. The customer may review the updated account information.

If the customer finds the account information changes acceptable, the customer may select one of the selectable inputs to affirmatively provide consent for the account information change. When the customer provides consent for the account information change, the mobile device may transmit the consent decision to the provider institution computing system. The provider institution computing system may then store a record of the consent decision in a consent database and transmit the record of the consent decision to the agent terminal and/or the mobile device. The agent may use the agent terminal to compile provider institution session documents and may submit those documents to the provider institution computing system. The provider institution computing system may then generate a customized visit summary that includes a record of the consent decisions as well as various other provider institution session documents or information summarizing services performed for the customer, including the account information change, during the provider institution session. The customized visit summary may then be transmitted to the agent terminal and/or the mobile device.

If the customer does not approve of the updated account information, the customer may select another of the selectable inputs to decline the account information change. If the customer declines to provide consent, the consent session may be terminated, whereupon the provider institution computing system may provide an indication to the agent terminal that consent has been declined. The provider institution computing system may then return prompt the agent via the agent terminal to revise the updated account information. Using the agent terminal, the agent may revise the updated account information and indicate that the updated account information has been revised and that the customer's consent for the revised changes is required. The provider institution computing system may then prompt the customer to provide consent for the revised account information changes by transmitting a new consent request notification to the mobile device associated with the customer.

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring now to FIG. 1, a block diagram of a consent capture system 100 is shown according to an example embodiment. The consent capture system 100 includes a provider institution computing system 110 associated with a provider institution, an agent terminal 200, and a mobile device 300 associated with a customer. The provider institution computing system 110 is associated with a provider institution, such as financial institution. For example, the provider institution may be a bank, credit union, credit card company, and so on. As described herein, the provider institution operates or manages one or more physical stores, locations, or branches. The provider institution may have multiple branch locations, and each branch location may have multiple agent terminals 200 that are configured to communicate over a network 105.

The mobile device 300 may be owned by or otherwise associated with a customer. The customer may be an individual, business representative, large and small business owner, and so on. The customer may be an existing client or a new client to the provider institution associated with the provider institution computing system 110. Furthermore, the customer may be an existing client of the provider institution who has previously enrolled in online banking services offered by the provider institution.

When the client is requesting various banking services, such as a name change, address change, or beneficiary change, the provider institution may require the customer's consent to make the change. Consent is typically necessary to protect the client and provider institution against fraudulent account information changes, for example. Consent may further require both that a customer has occasion to review certain information or terms and that the customer affirmatively provide an indication of consent, whether by providing a signature or selecting a button, for example.

As shown in FIG. 1, the provider institution computing system 110 includes a network interface circuit 120, a processing circuit 130, an agent terminal client circuit 135, a customer client circuit 136, an account information change circuit 140, a consent circuit 145, a customized visit summary circuit 150, and an input/output circuit 180. The network interface circuit 120 is structured to establish connections/communications with the agent terminal 200 and the mobile device 300 by way of the network 105. The network 105 may include one or more of the Internet, cellular network, Wi-Fi®, Wi-Max, a proprietary banking network, or any other type of wired or wireless network or a combination of wired and wireless networks.

The network interface circuit 120 includes programming and/or hardware-based components that connect the provider institution computing system 110 to the network 105. For example, the network interface circuit 120 may include any combination of a wireless network transceiver (e.g., Bluetooth® transceiver, cellular modem, a Wi-Fi® transceiver) and/or wired network transceiver (e.g., an Ethernet transceiver). In some arrangements, the network interface circuit 120 includes hardware and machine-readable media structured to support communication over multiple channels of data communication (e.g., wireless, Bluetooth®, near-field communication, etc.). In yet other arrangements, the network interface circuit 120 may include one or more cryptography modules to establish a secure communication session (e.g., using the IPSec protocol or similar) in which data communicated over the session is encrypted and securely transmitted.

The network interface circuit 120 may be coupled to the processing circuit 130 in order to enable the processing circuit 130 to receiving and transmit messages, data, and information via the network 105. To further support features of or interaction with the provider institution computing system 110, the network interface circuit 120 may provide a relatively high-speed link to the network 105, which may be any combination of local area network (LAN), an intranet (e.g., a private banking or retailer network), the Internet, or any other suitable communications network, directly or through another interface.

The processing circuit 130 is shown to include a processor 131, a memory 132 and may be communicably coupled to the account information change circuit 140, consent circuit 145, and customized visit summary circuit 150. More particularly each of the account information change circuit, 140, the consent circuit 145, and the customized visit summary circuit 150 may include program logic that may be executed by the processor 131 of the processing circuit 130, according to one embodiment. The account information change circuit 140 may include or be communicatively coupled to an account information database 141. The consent circuit 145 may include or be communicatively coupled to a consent database 146. Likewise, the customized visit summary circuit 150 may include or be communicatively coupled to a customized visit summary database 151.

The memory 132 includes one or more memory devices (e.g., RAM, NVRAM, ROM, Flash Memory, hard disk storage) that store data and/or computer code for facilitating the various processes described herein. That is, in operation and use, the memory 132 stores at least portions of instructions and data for execution by the processor 131 to control the processing circuit 130. The memory 132 may be or include tangible, non-transient volatile memory and/or non-volatile memory. The processor 131 may be implemented as one or more processors, application specific integrated circuits (ASIC), one or more field programmable gate arrays (FPGAs), a digital signal processor (DSP), a group of processing components, or other suitable electronic processing components. The processing circuit 130 may include one or more processors 131 that are configured to communicate such that the processing circuit 130 may perform or assist in performing any of the operations, steps, or methods discussed herein.

The agent terminal client circuit 135 is structured to provide an agent terminal client application on/to an agent terminal 200 and at least partially support certain functionality or operations thereof. In particular, the agent terminal client circuit 135 is structured to provide an agent terminal client application (e.g., agent terminal client application 235 discussed below) to the agent terminal 200. In this regard, the agent terminal client circuit 135 presents the agent with various agent interfaces enabling the agent to access or manage a customer's account information associated with the provider institution, and enables the agent to perform various services using the agent terminal, such as an account information change operation as discussed below.

The customer client circuit 136 is structured to provide a customer client application on/to a mobile device associated with a customer and at least partially support certain functionality or operations thereof. In particular, the customer client circuit 136 is structured to provide a customer client application (e.g., customer client application 340 discussed below) on/to the mobile device 300. In this regard, the customer client circuit 136 enables registrations of a customer for a customer client application 340 (i.e., enrollment in online provider institution services), presents the customer with various user interfaces enabling user to use or manage accounts of the customer associated with the provider institution, enables customers to perform transactions using the customer client application 340, and enables customers to perform or request other services associated with the provider institution.

The account information change circuit 140, the consent circuit 145, and the customized visit summary circuit 150 may include computer-executable code stored in the memory 132 or in one or more dedicated memory devices of each circuit. In another embodiment, the account information change circuit 140, consent circuit 145, and/or customized visit summary circuit 150 may be embodied machine-readable media storing instructions (or be embodied as instructions stored in the memory 132) that are executable by the processor 131.

The account information change circuit 140 is structured to facilitate changes associated with a customer's account information, namely changes effected by an agent via the agent terminal 200. For example, the account information change circuit 140 may receive altered account information from the agent terminal 200 and store the altered account information in the account information database 141. In this way, the account information changes made by an agent via the agent terminal 200 are stored in a database of the provider institution computing system 110.

The consent circuit 145 is structured to receive an indication that a customer's consent is required for a service, such as an account information change service. The consent circuit 145 is structured to receive an indication that consent is required from an agent terminal 200, as is described further below. In response to receiving an indication that consent is required, the consent circuit 145 is further structured to generate and transmit a notification to a computing device of the customer for a customer to provide consent. In some embodiments, the notification to provide consent may include a push alert, a text message, and/or an email message (or another message). The notification to provide consent may be transmitted from the provider institution computing system 110 to the mobile device 300 via the network 105. Furthermore, the consent circuit 145 may be configured to receive a consent decision from the mobile device 300 responsive to the notification to provide consent, the consent decision indicative of the customer's consent for the service or the customer's withholding of consent for the account information change. The consent circuit 145 may store a record of the consent decision in the consent database 146 and may transmit the record of the consent decision to the agent terminal 200 and/or the mobile device 300.

The customized visit summary circuit 150 is structured to facilitate the creation and storage of customized visit summary reports, documents, and/or information that summarize and record services performed by an agent on behalf of a customer, such as the performance of an account information change as discussed herein. The customized visit summary circuit 150 may gather information from one or more databases within or communicatively coupled to the memory 132, such as the account information database 141 or consent database 146. The customized visit summary circuit 150 is structured to transmit session data to the agent terminal 200, the session data associated with a customer's interactions with an agent during a particular visit to a branch location (i.e., a physical location of the provider institution). The customized visit summary circuit 150 is further structured to receive information, such as scanned documents, from the agent terminal 200. The customized visit summary circuit 150 is structured to generate a customized visit summary. The customized visit summary circuit 150 may then transmit the generated customized visit summary to the agent terminal 200 and/or the mobile device 300 of the customer. Finally, the customized visit summary circuit 150 may store the customized visit summary in the customized visit summary database 151.

The input/output circuit 180 is structured to receive communications from and provide communications to the agent terminal 200 and/or the mobile device 300. By communicating with the agent terminal 200, the provider institution computing system 110 may therefore communicate with an agent associated with the provider institution who is operating an agent terminal 200. In the same way, by communicating with the mobile device 300, the provider institution computing system 110 may communicate with a customer. Accordingly, the input/output circuit 180 includes communication circuitry for facilitating the exchange of data, values, messages, and the like between an input/output device and the components of the provider institution computing system 110. Furthermore, the input/output circuit 180 may also include machine-readable media for facilitating the exchange of information between an input/output device and the components of the provider institution computing system 110. In some embodiments, the input/output circuit 180 includes any combination of hardware components, communication circuitry, and machine-readable media.

The agent terminal 200 may be a computing device or system that is configured to interact with agents or users and communicate with the provider institution computing system 110 and/or mobile device 300 via the network 105. The agent terminal 200 as shown may be any suitable user computing device, such as a personal computer (i.e., desktop computer, laptop computer, etc.), a tablet, mobile phone, kiosk, or any other suitable user computing device capable of accessing and communicating via local and/or global networks. In this way, the agent terminal 200 may allow the agent to enter or modify account information stored in the account information database 141 of the provider institution computing system 110. The agent terminal 200 may be used by and associated with an agent (e.g., an employee, etc.) of the provider institution.

Various agents may operate an agent terminal 200 at a branch location of the provider institution in order to assist customers with a variety of different services. For example, an agent may use the agent terminal 200 to assist a customer with maintaining account information in order to ensure said account information remains current and accurate. In particular, an agent may use the agent terminal 200 to assist a customer in changing the customer's account information stored in the provider institution computing system 110 associated with the client's name after the customer is married, for example. Likewise, an agent may use the agent terminal 200 to change the customer's address because, for example, the customer has recently purchased a new home. In addition, an agent may use the agent terminal 200 to alter a customer's account beneficiary information pursuant to the customer's request. In other examples, the agent may facilitate other banking services, such as deposits, withdrawals, etc. In this regard, one or more agent terminals 200 may be located each branch location.

In the example shown, the agent terminal 200 may include a network interface circuit 220, a processing circuit 230, an agent terminal client application 235, and an input/output circuit 280. The network interface circuit 220, processing circuit 230 having a processor 231 coupled to a memory 232, and input/output circuit 280 may function substantially similar to and include the same or similar components as the network interface circuit 120, processing circuit 130, and an input/output circuit 180 described above with reference to the provider institution computing system 110. Accordingly, it will be understood that the description of the network interface circuit 120, processing circuit 130, and input/output circuit 180 provided above may be applied to the network interface circuit 220, processing circuit 230, and input/output circuit 280 of the agent terminal 200. The agent terminal client application 235 may include account information change processing logic 240 and customized visit summary logic 250.

In the example shown, the agent terminal client application 235 is an application software that includes program logic stored in a system memory (or other storage location) of the agent terminal 200 that includes account information change logic 240 and customized visit summary logic 250. In this embodiment, the account information change logic 240 and customized visit summary logic 250 are embodied as program logic. In some arrangements, the agent terminal client application 235 is communicably coupled via the network interface circuit 220 over the network 105 to the provider institution computing system 110 (e.g., the agent terminal client circuit 135). Accordingly, the agent terminal client application 235 may be at least partly supported by the agent terminal client circuit 135. Further, in some embodiments, the agent terminal client application 235 is stored by the memory device 232 of the agent terminal and selectively executable by the processor 231 of the agent terminal 200. The program logic may configure the processor 231 of the mobile device 300 to perform at least some of the functions discussed herein. In some embodiments, the agent terminal client application 235 is a stand-alone application that may be downloaded and installed on the agent terminal 200. In other embodiments, the agent terminal client application 235 is a web-based application that may be accessed using a browser. In still other embodiments, the agent terminal client application 235 is hard coded into memory, such as memory 232, of the agent terminal 200. In an alternate embodiment, the agent terminal client application 235 may be embodied as a "circuit" of the agent terminal 200 as circuit is defined herein. In the example shown, the agent terminal client application 235 is a downloadable client application on the agent terminal 200.

The agent terminal client application 235 is structured to perform a variety of functions. The agent terminal client application 235 is communicably coupled via the input/output circuit 280 over the network 105 to the provider institution computing system 110 for performing one or more functions described herein. As will be understood, the level of functionality that resides on the agent terminal 200 versus the provider institution computing system 110 will vary depending on the implementation.

For example, the agent terminal client application 235 may be structured to provide an operator of the agent terminal 200 (i.e., an agent) with the ability to interact with the provider institution computing system 110 to perform various services for a customer. For example, the agent terminal client application 235 may be structured to facilitate a customer's deposit and withdrawal of funds into/from an account of the customer. In addition, the agent terminal client application 235 may be structured to interact with the provider institution computing system 110 in order to complete an account information change at the request of a customer. More specifically, the agent terminal client application 235 may be configured to receive an indication from an operator of a desire to perform an account information change service and transmit that indication via the network 105 to the provider institution computing system 110. The indication of a desire to perform an account information change may also include information related to the particular account information the customer wishes to change. Thereafter, the agent terminal client application 235 may be structured to receive a script or prompt from the provider institution computing system 110 related to the requested account information change service. The script or prompt may be, for example, a fillable document displayed on a screen of the agent terminal 200 and/or may be a set of instructions structured to guide the agent through a process or rendering an account information change, for example. The agent terminal client application 235 may be structured to initiate steps, procedures, operations, etc., related to the account information change processing logic 240 in response to receiving a script or prompt from the provider institution computing system 110.

As shown, the account information change processing logic 240 (e.g., instructions, computer code, etc.) may be program logic included within the agent terminal client application 235. As such, the account information change processing logic 240 may be transmitted and implemented with the agent terminal client application 235 and may therefore be at least partially supported by the provider institution computing system 110 (e.g., the agent terminal client circuit 135). The account information change processing logic 240 may be structured or configured to provide the operator of the agent terminal 200 with the ability to effect changes to the account information associated with a customer. More particularly, the account information change processing logic 240 may be communicably coupled to the agent terminal client application 235 and may operate in response to an indication from the agent terminal client application 235. The account information change processing logic 240 may generate and display an account information change prompt graphical user interface that includes fields for an operator of the agent terminal 200 to complete. The fields (e.g., boxes, areas, etc.) may be related to the specific account information the customer wishes to change (e.g., name change, etc.). The account information change processing logic 240 may be structured to receive an input from the agent terminal 200 where said input alters, deletes, or adds information (i.e., letters, numbers, etc.) within the account information change prompt. After the operator has effected the desired account information changes, the account information change processing logic 240 is structured to transmit an indication to the provider institution computing system 110 that the account information change service is complete. In some embodiments, the account information change processing logic 240 is further structured to provide an indication to the provider institution computing system 110 to obtain consent for the operations performed during the requested account information change.

As shown, the customized visit summary logic 250 may be program logic (e.g., instructions, computer code, etc.) included within the agent terminal client application 235. As such, the customized visit summary logic 250 may be transmitted and implemented with the agent terminal client application 235 and may therefore be at least partially supported by the provider institution computing system 110 (e.g., the agent terminal client circuit 135). The customized visit summary logic 250 may be structured or configured to assist the operator of the agent terminal 200 in compiling information, such as scanned documents, etc. to be summarized in a customized visit summary. The "customized visit summary" refers to a report (e.g., one or more electronic document or documents that may be provided via one or more graphical user interfaces via the agent terminal 200) generated by the provider institution computing system 110 in relation to a provider institution session (i.e., a customer's interaction with the provider institution). More particularly, a customized visit summary may be generated upon the conclusion of a customer's provider institution session. The "provider institution session," as used herein, refers to a customer's interactions with an agent of the provider institution during a particular visit of the customer to a physical branch location of the provider institution. The provider institution session may begin when the customer approaches the agent and requests a service or services (e.g., an account information change) be performed and concludes upon completion of the requested service or services and/or the generation of a customized visit summary. The provider institution session thus includes the entirety of a customer's interaction with an agent during the customer's visit to the provider institution and therefore includes a summary of any consent provided by the customer for one or more services performed.

The customized visit summary may summarize the various services performed for or by the customer during the provider institution session and/or may include information regarding upcoming scheduled provider institution sessions. The customized visit summary logic 250 may be structured to receive provider institution (e.g., banking) session data from the provider institution computing system 110. The provider institution session data is data or other information associated with a customer's interactions with an agent during a particular provider institution session (i.e., a particular visit to a branch location). Accordingly, the provider institution session data may include, but is not limited to, a list of services performed, the names of individuals (i.e., agents) who performed those services, the location of the provider institution session, the date and time of the provider institution session, pertinent details related to the customer's account (e.g., account numbers or account balances), and/or any other data associated with the provider institution session.

The customized visit summary logic 250 may also be structured to receive information related to the provider institution session, such as scanned documents, messages from the agent or customer, etc. and transmit the information to the provider institution computing system 110, where said information may be used by the customized visit summary circuit 150 to generate the customized visit summary. In some embodiments, the customized visit summary logic 250 may also be structured to receive a record of a consent decision from the consent database 146 of the provider institution computing system 110.

The mobile device 300 may be used by an individual customer (e.g., a business owner or employee, a consumer, etc.) of the provider institution to perform various actions, such as providing consent for various services performed by an agent of the provider institution during the customer's visit to a branch location. The mobile device 300 is structured to exchange data over the network 105, execute software applications, access websites, generate graphical user interfaces, and perform other operations that are typical of mobile devices or at least as described herein. The mobile device 300 may be, for example, a cellular phone, smart phone, mobile handheld wireless e-mail device, personal digital assistant, portable gaming device, or other device suitable for the consent capture system 100 (e.g., laptop or other computing device, etc.). The mobile device 300 includes a display device 310, an input/output device 318, a camera 319, a network interface circuit 320, a processing circuit 330, a customer client application 340, and an input/output circuit 380. The customer client application 340 may further include consent logic 345. The processing circuit 330 may include a processor 331, a memory 332, and may be communicably coupled to the customer client application 340 and to the consent logic 345 included therein.

The input/output device 318 of the mobile device 300 includes hardware and associated logic (e.g., instructions, computer code, etc.) to enable the mobile device 300 to exchange information with a user and other devices (e.g., the agent terminal 200) that may interact with the mobile device 300. The input/output device 318 may be an input-only device (e.g., a button), an output-only device, or be a combination input/output devices. The input aspect of the user input/output device 318 allows the user to input or provide information into the mobile device 300, and may include, for example, a mechanical keyboard, a touchscreen, a microphone, a camera (e.g., camera 319), a fingerprint scanner, a device engageable to the source user mobile device 300 via a connection (e.g., USB, serial cable, Ethernet cable, etc.), and so on. The output aspect of the user input/output device 318 allows the user to receive information from the mobile device 300, and may include, for example, a digital display, a speaker, illuminating icons, light emitting diodes ("LEDs"), and so on. The input/output device 318 may also include systems, components, devices, and apparatuses that serve both input and output functions. Such systems, components, devices and apparatuses may include, for example, radio frequency ("RF") transceivers, near-field communication ("NFC") transceivers, and other short range wireless transceivers (e.g., Bluetooth®, laser-based data transmitters, etc.). The input/output device 318 may also include other hardware, software, and firmware components that may otherwise be needed for the functioning of the mobile device 300.

The network interface circuit 320 may include one or more antennas or transceivers and associated communications hardware and logic (e.g., computer code, instructions, etc.). The network interface circuit 320 is structured to allow the mobile device 300 to access and couple/connect to the network 105 to, in turn, exchange information with for example the provider institution computing system 110 and/or agent terminal 200. That is, the network interface circuit 320 is coupled to the processor 331 and memory 332 and configured to enable a coupling to the network 105. The network interface circuit 320 allows for the mobile device 300 to transmit and receive internet data and telecommunication data. Accordingly, the network interface circuit 320 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver). Thus, the network interface circuit 320 enables connectivity to WAN as well as LAN (e.g., Bluetooth, NFC, etc. transceivers). Further, in some embodiments, the network interface circuit 320 includes cryptography capabilities to establish a secure or relatively secure communication session between other systems such as the provider institution computing system 110, a second mobile device, the agent terminal 200, and/or any third-party computing system. In this regard, information (e.g., account information, login information, financial data, consent information, and/or other types of data) may be encrypted and transmitted to prevent or substantially prevent a threat of hacking or other security breach.

The mobile device 300 may generate and/or receive and present various display screens that include account information, transaction instructions, consent instructions, and so on. A graphical user interface may be generated by the mobile device 300 and used to request a consent decision from the customer. In some embodiments, a display screen may be used to request authentication information from the customer. Authentication information may be used to unlock the mobile device and/or open up and use customer client application 340. Thus, authentication information may include, but is not limited to, a credential (e.g., username and password information for the client application), biometric information (e.g., face scan, retina scan, fingerprint, etc.) for unlocking the mobile device 300 and accessing the customer client application 340, and so on. In yet another embodiment, a display screen may be used to present a customized visit summary relating to a customer's visit to a branch location. Such display screens are presented to the customer via the display device 310.

In the example shown, the customer client application 340 is an application software that includes program logic (e.g., computer code, instructions, etc.) stored in a system memory (or other storage location) of the mobile device 300 that includes consent logic 345. In this embodiment, the consent logic 345 is embodied as program logic (e.g., computer code, instructions, etc.). In some arrangements, the customer client application 340 is communicably coupled via the network interface circuit 320 over the network 105 to the provider institution computing system 110 (e.g., the customer client circuit 136). Accordingly, the customer client application 340 may be at least partly supported by the customer client circuit 136. Further, in some embodiments, the customer client application 340 is stored by the memory device of the mobile device and selectively executable by the processor of the mobile device 300. The program logic may configure the processor 331 of the mobile device 300 to perform at least some of the functions discussed herein. Thus, in some embodiments, the customer client application 340 is a stand-alone application that may be downloaded and installed on the mobile device 300. In other embodiments, the customer client application 340 is a web-based application that may be accessed using a browser. In yet other embodiments, the customer client application 340 is hard coded into memory, such as memory 332 of the mobile device 300. In yet other alternate embodiments, the client application 340 may be structured as a "circuit" as defined herein included with the mobile device 300. In the example shown, the client application 340 is a downloaded application onto the mobile device 300. As will be understood, the level of functionality that resides on the mobile device 300 versus the provider institution computing system 110 will vary depending on the implementation.

The customer client application 340 is structured to perform a variety of functions. The customer client application 340 is communicably coupled via the input/output circuit 380 over the network 105 to the provider institution computing system 110 for performing one or more functions described herein, including providing consent for a provider service via consent logic 345 as described herein.

Additionally, the customer client application 340 may be structured to generate and present, control, and otherwise manage displays or graphical user interfaces on the mobile device 300. For example, the customer client application 340 may enable the user to input information pertaining to creating and managing the user's account with the provider institution or providing consent for a provider service, and transmitting the information to the provider institution computing system 110. The customer client application 340 may also be used to perform other managerial operations related to the user's account with the provider institution. It is to be understood that while the consent logic 345 has been shown as being part of the customer client application 340, in other embodiments, the consent circuit may be a separate and stand-alone application.

As suggested above, the customer client application 340 may be structured to provide a customer with access to a variety of mobile banking and account management activities. In particular and as shown, the customer client application 340 is a provider institution application that may be at least partly supported by the provider institution computing system 110. Thus, the customer client application 340 may be a financial services application, which is shown as a mobile banking application that enables a customer to view, access, and manage accounts held by the provider institution (e.g., checking and/or savings account, mortgage account, brokerage account, and so on). The customer may interact with the customer client application 340 via the display device 310 and the input/output device 318. In some arrangements, the customer may only access the customer client application 340 upon providing requisite authentication information, such as username and password information, biometric information, etc. In this way, the customer's access to and use of the customer client application 340 is conditioned upon the customer's authentication, which may require the customer to register for an account. In some embodiments, the customer may be required to create a customer client application account and/or register in order to access to the customer client application 340, which may further require the customer to be customer of the provider institution. Upon receiving requisite authentication information, the customer client application 340 may be structured to initiate an authenticated session, whereupon the customer may have access to the functionality of the customer client application 340. The "authenticated session" refers to a usage session of the customer client application 340 following authentication of the user into the customer client application 340. The authenticated session may expire after a certain duration of time with or without action of the customer related to the customer client application 340. The customer client application 340 may be structured to prompt the customer to provide authentication information in the event the authenticated session expires.

As shown, the consent logic 345 may be program logic (e.g., instructions, computer code, etc.) included within the customer client application 340. As such, the consent logic 345 may be transmitted and implemented with the customer client application 340 and may therefore be at least partially supported by the provider institution computing system 110 (e.g., the customer client circuit 136). The consent logic 345 may be structured or configured to facilitate a consent session whereby the customer is enabled to provide consent for a service event regarding an account of the customer maintained by the provider institution. As used herein, the term "consent session" refers to the activities associated with the customer's rendering of a consent decision, including, for example, the customer's receipt of a consent request notification, review of the updated account information, and the selection of a selectable icon or link to provide an affirmative or negative consent decision. The consent session thus begins when the agent has performed a service and requests that the customer provides consent for the service (e.g., by reviewing the updated account information and providing or withholding consent for the updated account information). The consent session ends after the customer's consent decision is transmitted to the provider institution computing system 110 or to the agent, as described in detail below with reference to process 600 shown in FIG. 6.

The consent logic 345 may receive a consent request notification from the provider institution computing system 110 in relation to a requested account information change to initiate a consent session. As used herein, the term "account information change" refers to a provider institution service for updating, revising, creating, or otherwise maintaining the customer's account information associated with the provider institution. The consent request notification may be displayed on the display device 310. The "consent request notification" is structured to prompt, query, or otherwise notify the customer of the requested account information change and the associated need for the customer's consent for the account information change. In one embodiment, the consent request notification is or includes a selectable link (e.g., provided via an email or a text message), where selection of the link causes the consent logic 345 to display a consent display screen on the display device 310. In another embodiment, the consent request notification may be a push notification provided by the customer client application 340 that, when selected, may open the customer client application 340 on the mobile device 300. In another embodiment, the consent request notification may be included as a splash page that is displayed when the user accesses the customer client application 340.

In some embodiments, the customer may also be prompted by the consent logic 345 to provide authentication information, such as username and password information, biometric information, etc. before the consent logic 345 provides the consent display screen, as is discussed in further detail below with reference to FIGS. 2 and 3. In some arrangements, the customer may not be required to provide authentication information because the customer has already initiated an authenticated session in relation to the customer client application 340 as discussed above. In such instances, the authenticated session may be used to authenticate the customer's activities associated with the consent logic 345.

The consent logic 345 may receive an indication from the customer approving or denying the account information change, as is described in detail below. For example, the consent logic 345 may receive an indication from the user approving or denying the account information change based on the user's selection of a selectable icon displayed on the display device 310 of the mobile device 300. In the event the customer provides affirmative consent, the consent logic 345 may be structured to provide an indication of a consent decision to the provider institution computing system 110 and/or agent terminal 200 via the network 105. In the event the customer declines to provide consent, the consent circuit may likewise be structured to provide an indication of the consent decision to the provider institution computing 110 system and/or agent terminal 200. The consent logic 345 may be structured to present to the customer, via the display device 310, a consent session summary display screen (e.g., landing page, etc.) providing a visual indicator to the customer that the consent decision, whether providing consent or withholding consent, has been received by the consent logic 345 and/or received by the provider institution computing system 110 or agent terminal 200.

It should be understood that the mobile device 300 may include other structures with associated functionality as well. For example, the mobile device 300 and/or customer client application 340 may include location determination logic. The location determination logic determines the location of the mobile device 300 (e.g., for use by the customer client application 340). A customer may opt-in to using the location determination logic to provide enhanced protection against fraudulent transactions, as described below. The location determination logic may use a satellite (GPS) sensor or cellular towers to determine the location coordinates of the mobile device 300 include a global positioning system (GPS) structured to at least one of determine or receive data indicative of the geolocation of the mobile device 300. This "location data" may provide an indication of a location of the mobile device 300. In certain embodiments, location data may also be used to identify a particular branch or location associated with the enterprise that the client wishes to enter in order to receive assistance. Moreover, this location data may also be used to verify that the mobile device 300 is at or within a predetermined distance of a physical branch location of the provider institution by matching the determined location of the mobile device 300 with a known or determined location of a branch of the provider institution.

Figure 3:
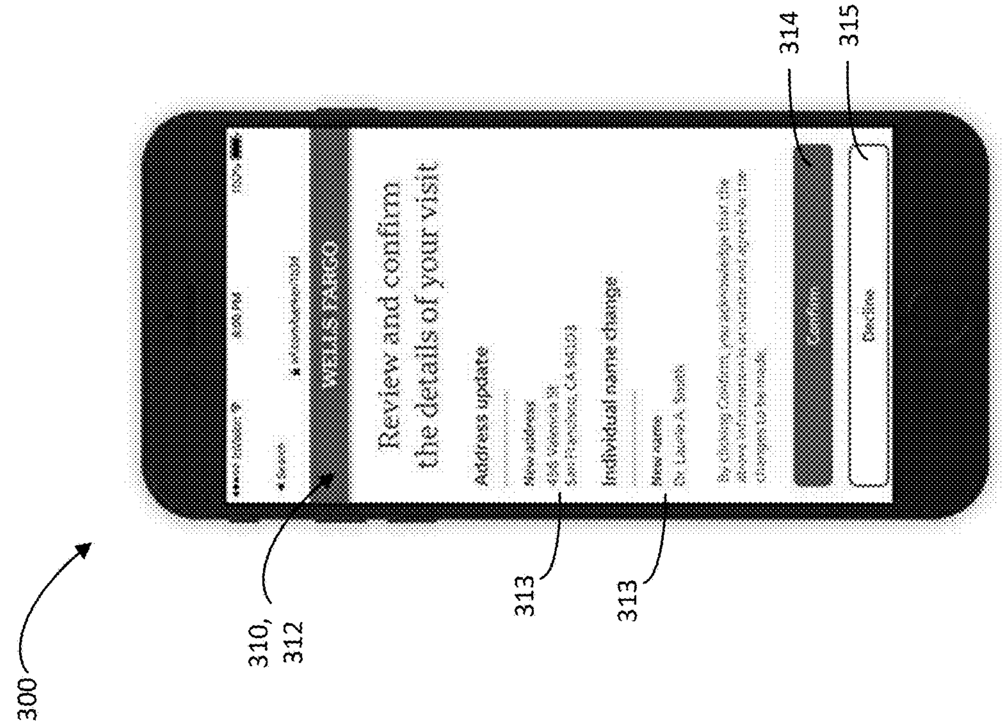
FIG. 3 is an illustration of a display screen that may be displayed to a user of the consent capture system of FIG. 1, according to an example embodiment.
Figure 2:
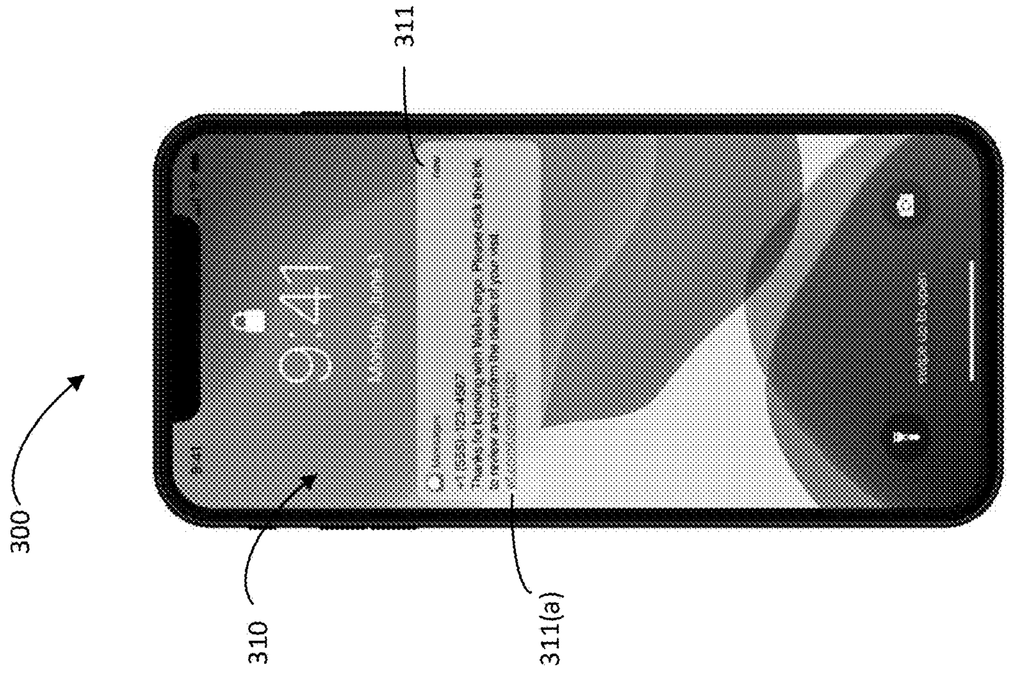
FIG. 2 is an illustration of a display screen that may be displayed to a user of the consent capture system of FIG. 1, according to an example embodiment.

Referring now to FIGS. 2 and 3, various screens of the mobile device 300 for providing digital consent are shown, according to example embodiments. The display device 310 of the mobile device 300 may receive a display screen including a consent request notification 311, where the consent request notification 311 is a text message, push notification, etc. The display device 310 may further receive a consent display screen 312, as shown in FIG. 3. The consent display screen 312 may include updated account information 313, a confirmation input icon 314, and a rejection input icon 315. The confirmation input icon 314 and the rejection input icon 315 may be communicably coupled to the input device 318, particularly in embodiments where the input device 318 is a touchscreen display. Accordingly, the confirmation input icon 314 and the rejection input icon 315 may be selectable icons. In other embodiments, the display screens may be generated by the customer client application 340 and provided via the display device of the mobile device 300.

In some embodiments, the display device 310 may present the consent display screen 312 after a customer begins an authenticated consent session in response to receiving the consent request notification 311. More specifically, the customer may be required to provide customer authentication information, such as username and password information, biometric information, a two-factor authentication (2FA) code, etc. in order to view the consent display screen 312. Because the consent display screen 312 includes updated account information 313 as well as the ability to confirm account information changes via the confirmation input icon 314 or deny the same via the rejection input icon 315, authentication information may be necessary to bolster the security of the consent capture system 100 and to protect against fraud and the like.

In some arrangements, the customer may only select the confirmation input icon 314 or the rejection input icon 315 while interacting with the consent display screen 312. In other words, the customer may not be permitted to provide other forms of input or edit the updated account information, for example. However, in some arrangements, the updated account information 313 may also be a selectable field such that the customer may selectively edit the account information 313 via one or more customer input devices 318. In such embodiments, the customer may correct or revise the updated account information 313 in the event it is inaccurate, incomplete, etc.

In some arrangements, the consent display screen 312 may not include input icons 314, 315 and may instead include a signature input icon, check box icons, radio button icons, etc. For example, rather than selecting the confirmation input icon 314 to affirmatively consent to some service, the customer may be prompted to provide a signature to indicate consent. More specifically, the consent display screen 312 may include a signature block that is communicably coupled to the input device 318, namely a touchscreen, of the mobile device 300 such that the customer may write or draw a digital signature on the mobile device with their finger, a stylus, or other means. In such arrangements, the customer's digital signature is captured via the consent capture system 100. In some embodiments, the customer may be prompted to type or write their name or initials via the mobile device 300 in order to provide consent. In yet other embodiments, the customer may affirmatively consent or withhold consent by voice, such as by speaking the word "approve" or "deny" into an input/output device 318 configured to detect audio signals, such as a microphone.

In another embodiment, the consent display screen 312 may be provided via a browser accessed by the mobile device 300. As noted above, the customer client application 340 may be accessible through a browser (e.g., Internet browser) accessed by the mobile device. Accordingly, the updated account information 313, the confirmation input icon 314, and the rejection input icon 315 may be displayed on a consent display screen 312 presented in a browser version of the customer client application 340, where the customer client application 340 generates and provides the consent display screen 312 to the mobile device 300 via a browser.

Figure 4:
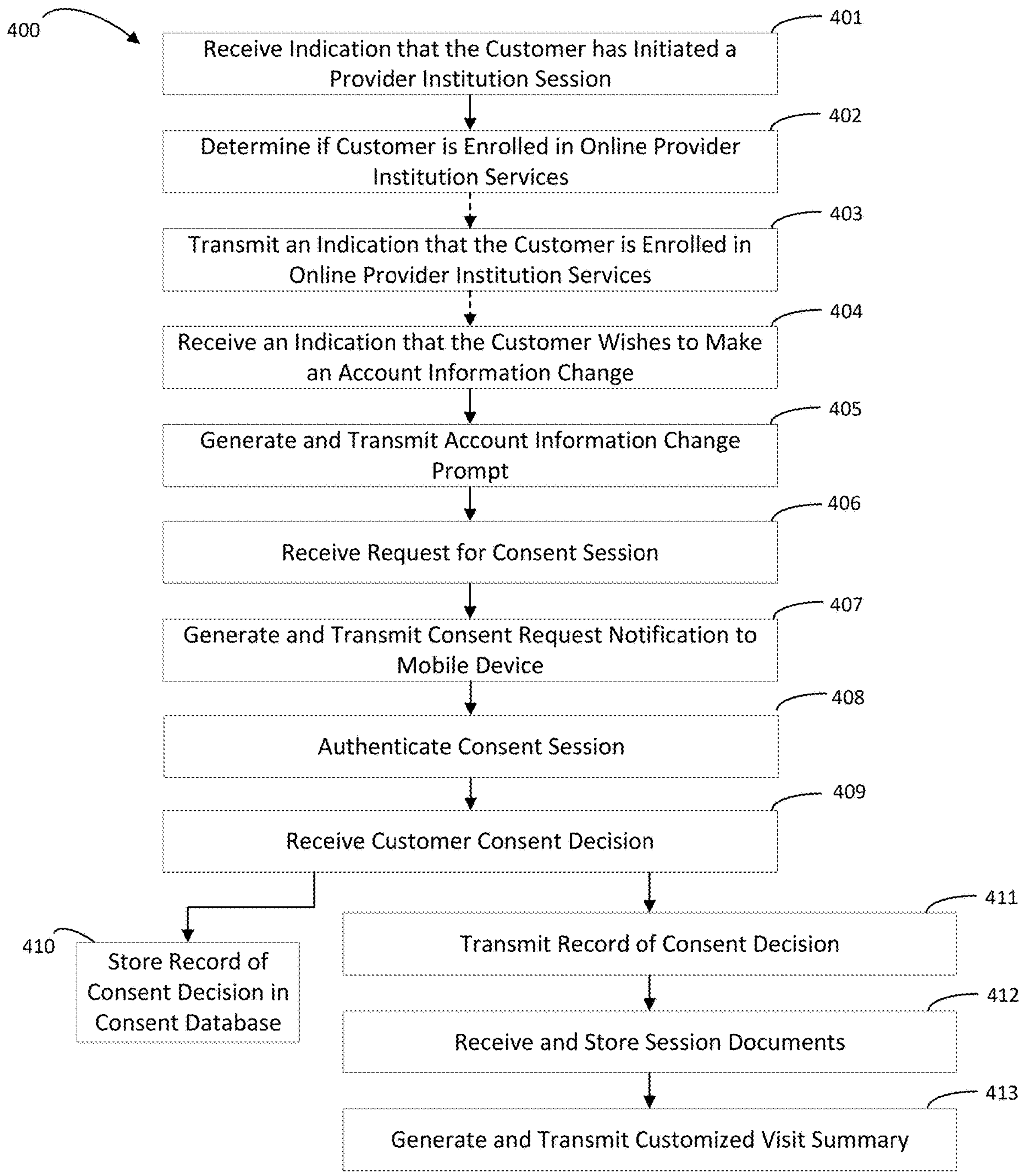
FIG. 4 is a flow diagram of a method for capturing a user's consent via a computing device of the user, according to an example embodiment.

Referring now to FIG. 4, a flow chart of a process 400 of facilitating an account information change service, obtaining consent for the service, and generating a customized visit summary in relation to the service is shown, according to an example embodiment. Process 400 may be executed by the provider institution computing system 110 in cooperation with the agent terminal 200 and mobile device 300. The process 400 may occur as a result of a customer's request to perform an account information change at a branch location, where the account information change requires the customer's consent to make the changes, such as a name or address change.

In process 401, the provider institution computing system 110 receives an indication that the customer has initiated a provider institution session, where such indication may be provided by an agent accessing an agent terminal 200 to initiate the agent terminal client application 235 in relation to the customer's account. A provider institution session may be initiated after, for example, the customer approaches the agent (e.g., a teller) within the branch location, via drive-thru banking, or otherwise and requests a provider institution session during which any number of services (e.g., deposit/withdrawal, account information change, etc.) may be performed.

At process 402 and after a provider institution session has been initiated, the provider institution computing system 110 may optionally determine if the customer is enrolled in online provider institution services, such as services associated with the customer client application 340 like online banking (i.e., OLB). If a customer is enrolled in such services, the customer may possess an authentication credential for utilizing the online provider institution services. As noted above, the customer may be required to provide an authentication credential to access the customer client application 340. The provider institution computing system 110 may automatically detect that the customer is enrolled in online provider institution services by, for example, identifying within the customer's account information stored within the account information database 141 that the client is enrolled in online provider institution services. In some embodiments, the provider institution computing system 110 may include customer client application detection means for detecting the presence of the customer client application 340 on the customer's mobile device 300. For example, the provider institution computing system 110 may receive a shared location of the mobile device 300 where the shared location data includes an indication (e.g., code or token) that the mobile device 300 includes the customer client application 340 and where the location of the mobile device 300 is at or within a predetermined distance of a physical branch location of the provider institution. The provider institution computing system 110 may determine whether the customer has enrolled in online provider institution services when the provider institution computing system 110 transmits a consent request notification, as is described in further detail below.

At process 403, the provider institution computing system 110 transmits an indication to the agent terminal 200 that the customer is or is not enrolled in online provider institution services. Such a determination allows the agent to obtain one-time consent from the customer to interact with the customer's mobile device 300 (i.e., consent to text, etc.) for the purposes of facilitating the customer's consent for various services via the consent capture system 100, should such one-time consent be necessary. In some embodiments, the provider institution computing system 110 may cause the agent terminal 200 to prompt the agent to obtain such one-time consent to text the mobile device 300. In some arrangements, the provider institution computing system 110 will not prompt the agent terminal 200 to obtain one-time consent because, for example, the customer is enrolled in online provider institution services and no additional action is required to enable the agent to interact with the mobile device 300 for the purposes of obtaining consent via the consent capture system 100 described herein.

At process 404, the provider institution computing system 110 receives an indication from the agent terminal 200 that the customer wishes to perform an account information change to alter, revise, create, or update one or more account information fields associated with the customer. The indication received from the agent terminal 200 may also include information pertaining to the particular account information fields the customer wishes to change. The indication may include, for example, a request to change the customer's address, marital status, beneficiary information, etc.

Based on the specified account information to which the customer wishes to make changes, the provider institution computing system 110 generates an account information change prompt at process 405. The account information change prompt may be generated by the account information change circuit 140 and may include one or more selectively editable fields corresponding to various account information fields, namely those account information fields specified in the indication to perform an account information change of process 404. In generating the account information change prompt, the provider institution computing system 110 may access the account information database 141 and obtain the customer's existing account information, particularly the account information fields identified in process 404. The existing account information fields may be included in the account information change prompt as editable fields such that an agent making changes to the customer's account information can edit existing information rather than entering it anew. The provider institution computing system 110 may transmit the generated account information change prompt to the agent terminal 200 via the network 105.

In relation to the account information change requested by the customer, the provider institution computing system 110 receives a request for a consent session from the agent terminal 200 at process 406. More specifically, the provider institution computing system 110 receives an indication that the agent has completed the requested account information change and that, according to provider institution policy, customer request, applicable laws, or otherwise, the customer's consent for the account information change must be obtained. The request for a consent session may be an express request for consent, such as by a manual indication from the agent via the agent terminal 200. In some embodiments, the request for consent may be automatically generated by the agent terminal 200 in response to the completion of the account information change prompt. In some arrangements, the request for consent may be automatically generated by the account information change processing logic 240 in response to a separate indication from the agent terminal 200 that the account information change service is complete, such as by an indication that the agent has filled out the account information change prompt.

The request for consent session received at process 406 may also include the updated account information as updated by the agent via the agent terminal 200. More specifically, the consent session request of process 406 may include the account information entered into the account information change prompt by the agent via the agent terminal 200.

At process 407, the provider institution computing system 110 generates and transmits a consent request notification to the mobile device 300 in response to receiving a request for consent session from the agent terminal 200. The generation and transmission of the consent request notification may be performed by the consent circuit 145 of the provider institution computing system 110. As discussed above, the consent request notification may be a text message, SMS message, push notification, a combination thereof, and/or another form of notification. In some arrangements, the consent request notification of process 408 may be a text message or SMS message, such as the consent request notification 311 shown in FIG. 2, and may containing a selectable link, such as the selectable link 311(*a*) shown in FIG. 2, where selection of the link directs a customer to a consent page, such as the consent display screen 312 as shown in FIG. 3.

As described above with reference to FIGS. 2 and 3, the link contained within the transmitted consent request notification may include functionality to detect the presence of the customer client application 340 associated with the provider institution on the mobile device 300 of the customer. For example, the link may detect the presence of the customer client application 340 on the mobile device 300 by mobile application deep linking technology or similar. The deep link may be a Uniform Resource Identifier (URI) that identifies a resource that may or may not be accessible on the Internet. Moreover, the URI is structured to open an application that can handle the uniform resource identifier (i.e. locate the resource), where the application can be specified by a user as a preferred application or that is selected by the user from a list of available applications.

For example, the link may be a default or deferred deep link that is configured to direct the user to an application installed on the mobile device 300, such as the customer client application 340, if the application is installed on the mobile device 300. In the case of the deferred deep link, the link may direct the user to an application store (e.g., Google Play Store, etc.) where the application can be downloaded if the mobile device 300 does not have the application installed. Once the application is installed, the deferred deep link will cause the application to take the user to the "deferred" content immediately after the application is first launched, as is understood in the art. Furthermore, the link may cause a web browser to open and display the consent display screen 312 as a web version of the customer client application 340 if the user does not have the application installed on the mobile device 300. Accordingly, the link may be structure to first direct a user to the application if the application is installed on the device or, alternatively, to one or more of an application store or web browser if the application is not installed on the mobile device 300.

The consent page transmitted by the provider institution computing system 110 at process 407 may include the updated account information, similar to the updated account information 313 shown in FIG. 3. As described above with reference to process 408, the updated account information may be received by the provider institution computing system 110 along with the request for consent session. The provider institution computing system 110 may include this same updated account information in the consent page that is associated with the selectable link of the consent request notification.

At process 408, the provider institution computing system 110 authenticates the consent session. More particularly, the provider institution computing system 110 may receive authentication information from the mobile device 300 based on the customer's response to the consent request notification 311. To access the consent display screen 312 or more generally access the consent session, the customer may be required to provide one or more authentication credentials, such as username and password information, biometric information, two-factor authentication (2FA), etc. in order to authenticate the consent session. This authentication ensures that the customer providing consent is the customer associated with the provider institution session and the service for which consent is required, such as an account information change service. If the customer has already started an authenticated session within the customer client application 340 of the mobile device 300, where said authenticated session is still active, the customer may not be required to provide additional authentication information. Rather, previously-provided authentication information will serve to authenticate the consent session.

By receiving authentication information from the mobile device 300 at process 410, the provider institution computing system 110 allows the consent session to proceed with a variety of mobile devices 300, rather than just permitting the consent session to proceed with a known mobile device 300. For example, if the customer has not enrolled in provider institution online provider institution services such as online banking services, the customer may still use their mobile device 300 to provide consent because the consent session is authenticated by the provider institution computing system 110 in connection with the consent session and independent of the customer client application 340. In some embodiments, therefore, the particular mobile device 300 used to provide consent may not affect the ability to initiate a consent session if, for example, it is not owned by the customer or is not known by the provider institution to be associated with the customer. Instead, the provider institution computing system 110 utilizes the authentication information as the determining criteria.

At process 409, the provider institution computing system 110 receives a consent decision from the mobile device 300. The consent decision is an indicator of the customer, via the mobile device 300, approving or denying the requested account information change. The customer's consent decision may be transmitted from the mobile device 300 over the network 105 upon the customer's selection of one of the input icons 314, 315, as is described in further detail below. In some embodiments, the provider institution computing system 110 may only receive a consent decision if the customer has affirmatively consented to the service (e.g., the customer has selected the confirmation input icon 314 upon reviewing the updated account information 313). In some arrangements, the consent decision may cause the consent circuit 145 of the provider institution computing system 110 to suspend or terminate operations related to obtaining consent (e.g., operations associated with the consent circuit 145). This may occur in response to a consent decision indicating that a customer has declined to provide consent, such as when the customer has selected the rejection input icon 315 on the consent display screen 312.

Rather than receive an indication of a consent decision from the mobile device 300, the provider institution computing system 110 may also receive an indication of a consent decision from the agent terminal 200. More particularly, in some circumstances, the customer may verbally communicate a decision to decline consent to the agent operating the agent terminal 200 instead of selecting the rejection input icon 315. In such embodiments, the agent may provide an indication to the provider institution computing system 110 via the agent terminal 200.

Upon receiving a consent decision from the mobile device 300, the provider institution computing system 110, at process 410, stores a record of a consent decision. As discussed above with reference to process 409, in some embodiments a record of a consent decision may only be received by the provider institution computing system 110 the event the customer affirmatively provides consent for the service. However, in some embodiments, a record of a consent decision associated with a customer's decision to withhold consent may also be received by the provider institution computing system 110. In either case, records of consent decisions may be stored by the consent circuit 145 in a consent database, such as the consent database 146. Records may be stored in the consent database 146 along with other data related to the customer's provider institution session, such as session data from the agent terminal 200, data identifying to the mobile device 300, data associating the record of the consent decision with a customized visit summary, etc. In some embodiments, the record of the consent decision may be associated with the customer's account information (e.g., associated by a unique customer identifier, etc.) within the consent database 146 and the account information database 141 such that the record of the consent decision may be located within the customer's account records such that a record of account information changes is tracked and maintained by the provider computing system 110. In some arrangements, the record of the consent decision may also include other information associated with the consent decision, such as (a) the customer's authentication method, (b) device information (e.g., device type, device operating system, device identifier such as a unique device token or identification value, etc.), (c) the content presented to the customer via the consent display screen 312, (d) the result of the customer's consent decision (i.e., confirm, reject, or modify), and (e) date and time of consent decision or expiration of consent session.

At process 411, the provider institution computing system 110 transmits an indication of a customer's consent decision to the agent terminal 200. Because a record of the consent decision may be transmitted from the mobile device 300 to the provider institution computing system 110, but not to the agent terminal 200, the provider institution computing system 110 may be structured to provide an indication to the agent terminal 200 that the customer has provided consent for the service in relation to the requested consent session of process 407. In some embodiments, the provider institution computing system 110 may be structured to cause the agent terminal 200 to display a confirmation message that the customer has affirmatively provided consent or otherwise rendered a consent decision. Likewise, the provider institution computing system 110 may provide an indication to the agent terminal 200 that the customer has withheld consent.

As noted with reference to process 409, the customer may communicate a decision to withhold consent via verbal communication with the agent during the provider institution session. In such embodiments, the provider institution computing system 110 may not transmit any indication regarding the consent decision to the agent terminal 200 as such an indication may superfluous.

At process 412, the provider institution computing system 110 receives from the agent terminal 200 information related to the provider institution session, including scanned documents, comments from the agent, or other information. More particularly, the customized visit summary circuit 150 may receive information, documents, etc. related to a provider institution session and store the same in the customized visit summary database 151 and/or the account information database. Documents may be manually entered, generated by the agent terminal via the agent terminal client application 235, or otherwise.

At process 413, the customized visit summary circuit 150 may use the information received and stored at process 412 to generate a customized visit summary related to the customer's provider institution session. Specifically, the customized visit summary circuit 150 may use information stored in the account information database 141, the consent database 146, and the customized visit summary database 151 to generate a customized visit summary document that summarizes pertinent information related to the customer and the various services performed during the particular provider institution session or otherwise. The customized visit summary circuit 150 may also be structured to store the generated customized visit summary in the customized visit summary database 151. In some embodiments, the information used to generate the customized visit summary as well as the generated customized visit summary may each include a unique identifier to associate the information and summary with the customer.

Finally, the customized visit summary circuit 150 may transmit the generated customized visit summary to the agent terminal 200 and/or the mobile device 300. The generated customized visit summary may be transmitted to the mobile device 300 as a selectable link embedded within a text message, SMS message, push notification, or email. In some embodiments, the generated customized visit summary may be included as an attachment or downloadable file accessible via an email or via the customer client application 340. The generated customized visit summary may be accessible for a limited period of time, such as 90 days, for example.

Figure 5:
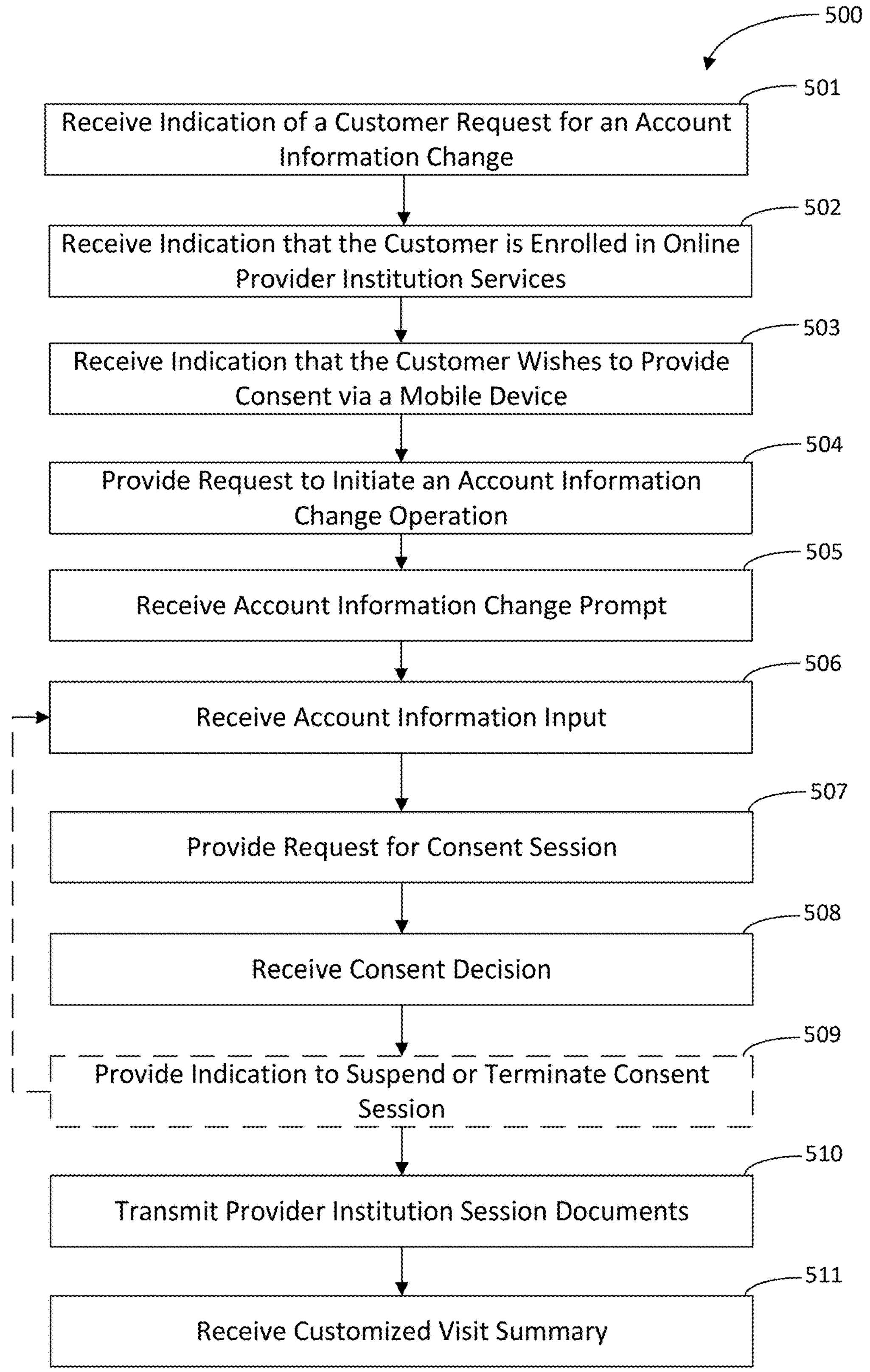
FIG. 5 is a flow diagram of a method for capturing a user's consent via a computing device of the user, according to another example embodiment.

Turning now to FIG. 5, a flow chart of a process 500 detailing the process of facilitating an account information change service, obtaining consent for the service, and generating a customized visit summary in relation to the service is shown, according to an example embodiment. The process 500 may be performed by an agent terminal, such as the agent terminal 200 as detailed above. The process 500 assumes that a customer has approached an agent at a branch location, via a drive-through banking system, or otherwise, to initiate a provider institution session.

Because the process 500 involves an interaction between a customer and an agent operating an agent terminal 200, it may be necessary for the agent terminal 200 and/or the provider institution computing system 110 to determine that the mobile device 300 is at or within a predetermined proximity of a physical branch location of the provider institution. For example, the mobile device 300 has location determination logic that uses a satellite (GPS) sensor or cellular towers to determine the location or location coordinates of the mobile device 300. The determined location or location coordinates of the mobile device can then be compared against a known location of a physical branch location of the provider institution in order to confirm that the mobile device is at or within a predetermined distance of the physical branch location. This location matching process can be used to bolster security surrounding various provider institution services, such as account information changes, in order to further prevent against unauthorized or malicious access to and alteration of a customer's account or account information.

Similarly, the agent terminal 200 or the physical branch location of the provider institution in which the agent terminal 200 resides may also have location determination logic that uses a satellite (GPS) sensor or cellular towers to determine the location or location coordinates of the agent terminal 200 and/or the physical branch location of the provider institution. In this way, the determined location of the mobile device 300 as described above can be compared with a determined location of the agent terminal 200 and/or physical branch location in order to ensure that the mobile device 300 is within appropriate proximity of the agent terminal 200 to initiate various provider institution services under process 500 or otherwise. In one embodiment, the provider institution may have one more GPS sensors or signal transmitters (or other location identifier means) disposed within and/or outside of the physical branch location (e.g., at a drive-through ATM location, etc.) so that the location of the mobile device 300 can be compared with locations associated with the agent terminal 200 (e.g., to verify that the mobile device 300 is within a drive-through ATM line).

At process 501, the agent terminal 200 receives an indication that a customer wishes to perform a service during the provider institution session, such as an account information change operation. The agent terminal 200 may receive the indication via an input provided by an agent operating the agent terminal 200. Such an input may be provided within, for example, the agent terminal client application 235. Within the agent terminal client application 235, the agent may be able to provide an indication to the agent terminal 200 via one or more input devices as to what services a customer wishes to perform during the provider institution session. In the process 500 detailed herein, the customer wishes to perform, among other services, an account information change service. As will be appreciated, various processes of the process 500 may also be applicable to other services that may be performed during a provider institution session, particularly those that require the customer's consent.

At process 502, the agent terminal 200 may optionally receive an indication from the provider institution computing system 110 that the customer is presently enrolled in online provider institution services, such as online banking services with the financial instruction, as described above with reference to process 402. In some embodiments, the indication that the customer is presently enrolled in online provider institution services may be transmitted by the provider institution computing system 110 based on the provider institution computing system 110 detecting the presence of a customer client application 340 associated with the provider institution on the mobile device 300 of the customer. In some arrangements, the account information of the customer as stored in the account information database 141 of the provider institution computing system 110 may be displayed on the agent terminal 200 via the agent terminal client application 235 where the account information provides that the customer is enrolled in online provider institution services.

As shown in process 503, the agent terminal 200 receives an indication that the customer wishes to provide consent for certain provider institution session services via the mobile device 300. An agent operating the agent terminal 200 may provide the indication that the customer would like to provide consent via mobile device 300 in response to a request from the customer. For example, the customer may be within a physical branch location of the provider institution and my may be interacting directly with an agent operating an agent terminal 200 (e.g., a teller at a financial institution). As described above, the determined location of the mobile device 300 may be used to verify that the mobile device 300 of the customer is within the physical branch location and/or is within a predetermined distance of the agent terminal 200. Such location matching functionality can be implemented to determine that the customer is physically present before the agent (e.g., in a face-to-face interaction). The customer may express a desire to alter, update, create, or otherwise modify account information associated with the customer's account at the provider institution. In response to the customer's expressed desire to perform account information change operations, the agent may provide an indication on the agent terminal 200 (i.e., select a selectable icon associated with account information change operations) to initiate an account information change operation on the agent terminal 200.

In some embodiments, the account information associated with the customer that is presented via the agent terminal client application 235 may include an indication that the customer prefers to provide consent for services via the mobile device 300. In some arrangements, the agent terminal 200 may also provide, in response to receiving an indication that the customer wishes to provide consent via mobile device 300, an indication that the customer has not yet authorized the provider institution or its representatives to communicate via the customer's mobile device 300. In such embodiments, the agent may then be prompted by the agent terminal 200 to obtain one-time consent to text or similar authorization from the customer. The one-time consent or authorization may be received by the agent terminal 200 and transmitted to the provider institution computing system 110 for storage in one or more databases, such as the account information database 141 or the consent database 146.

At process 504, the agent terminal 200 provides a request to the provider institution computing system 110 to begin an account information change service. The agent terminal client application 235 may facilitate this request. For example, the agent operating the agent terminal 200 may select an option (e.g., a selectable icon) provided via a graphical user interface of the terminal 200 to begin an account information change procedure. The agent may also indicate via the agent terminal 200 that the customer wishes to perform an account information change operation. Additionally, the agent terminal 200 may receive an indication from the customer regarding the particular information that the customer desires to change. In one embodiment, this reception is done verbally (i.e., the customer tells the agent in person) while in another embodiment, the customer provides the indication via the mobile 300. The information that is requested to be changed may include, but is not limited to, particular account information fields, such as telephone number and mailing address fields, while not altering others such as the customer name or date of birth, for example. The agent terminal 200 may then provide an indication of the specified account information fields within the request for an account information change.

As noted above with reference to process 405 shown in FIG. 4, the information contained within the request for an account information change operation, namely the specified account information fields, may be used by the provider institution computing system 110 to generate an account information change prompt. The account information change prompt may be transmitted by the provider institution computing system 110 received by the agent terminal 200 in process 505. The prompt may then be presented to the agent via the agent terminal 200.

At process 506, the agent terminal 200 may receive account information change information using the functionality of the account information change processing logic 240. More particularly, the account information change processing logic 240 may receive input(s) from the agent via an input device of the agent terminal 200 in order to alter, revise, create, or otherwise modify various fields (i.e., name, phone number, mailing address, etc.) within the account information change prompt provided by the provider institution computing system 110. Furthermore, the altered, revised, created, or otherwise modified account information change information may be received according to the account information change prompt of process 405. The account information change prompt may be displayed on the agent terminal and may have selectively editable fields that allow the agent operating the agent terminal 200 to effect changes to the specified account information fields.

At process 507, the agent terminal 200 provides a request for a consent session to the provider institution computing system 110. The agent terminal 200 may provide the request for a consent session in response to an indication from the agent operating the agent terminal 200 that the account information change prompt has been completed. Alternatively, the agent terminal 200 may automatically detect that the account information change prompt has been completed and may transmit the request for consent session in response thereto. The request for a consent session may include information pertaining to the consent request, such as the account information received by the agent terminal 200 in relation to the account information change prompt. The request for consent session may also include other information related to the provider institution session or customer as necessary to associate the requested consent session with the customer and the particular services requiring consent.

At process 508, the agent terminal 200 receives a consent decision. The consent decision refers to an indication provided by the mobile device 300 that either affirmatively provides consent for the provider institution service (e.g., consent for the account information change) or withholds/denies consent for the same, as discussed in detail below. In one embodiment, the agent terminal 200 may receive a consent decision from the provider institution computing system 110. The consent decision may include a record of a consent decision in the instance where the customer affirmatively provides consent for a particular service (i.e., an account information change). In some embodiments, the consent decision may include an indication that the customer has declined to provide consent for the service. The consent decision may be transmitted from provider institution computing system 110 to the agent terminal 200. As noted above with respect to process 409 of the process 400 shown in FIG. 4, the provider institution computing system 110 may receive the consent decision from the mobile device 300 in response to the customer's selection of one of the input icons 314, 315. In some embodiments, the agent terminal 200 may only receive a consent decision from the provider institution computing system 110 if the consent decision indicates that the customer has consented to the service (e.g., the customer has selected the confirmation input icon 314 upon reviewing the updated account information 313. In some embodiments, the agent terminal 200 may receive the consent decision directly from the mobile device 300.

Rather than receive an indication of a consent decision from the provider institution computing system 110, the agent terminal 200 may also receive an indication of a consent decision from the agent. More particularly, in some circumstances the customer may verbally communicate a decision to decline consent to the agent operating the agent terminal 200 instead of selecting the rejection input icon 315 via the mobile device 300. For example, upon inspecting the updated account information 313, the customer may identify an error in the updated account information and verbally communicate that error and denial of consent to the agent. In such cases, the agent may provide an indication to the agent terminal 200 that the customer has declined consent because the customer did not provide the indication to decline consent via the mobile device 300. At process 509, the agent terminal 200 may then provide an indication to the provider institution computing system 110 to suspend or terminate the consent session. In some arrangements, the consent session may be suspended or terminated in order to revise the account information to change to correct an error or omission. Accordingly, the indication to suspend or terminate the consent session at process 509 may cause the provider institution computing system 110 and the agent terminal 200 to resume the account information change operations associated with the account information change circuit 140 and account information change processing logic 240, respectively. The process 500 may thus return to process 506 such that the agent terminal 200 may receive additional account information input to correct any error, omission, etc.

Once an affirmative consent decision has been recorded and the customer has indicated a desire to conclude the provider institution session, the agent terminal 200 transmits provider institution session documents, account information change documents, other documents associated with banking services, or other information to the provider institution computing system 110 and other session information to the provider institution computing system 110 at process 510. More particularly, the agent terminal 200 may transmit session documents and other session information to the customized visit summary circuit 150 of the provider institution computing system 110. The compilation and transmission of session documents and information via the agent terminal 200 may be facilitated by the customized visit summary logic 250.

At process 511, the agent terminal 200 may receive a customized visit summary relating to the provider institution session. From the agent terminal 200, the agent may view, print, file, etc. the customized visit summary. The agent terminal 200 may also be structured to transmit the customized visit summary to the client or to other interested parties.

Figure 6:
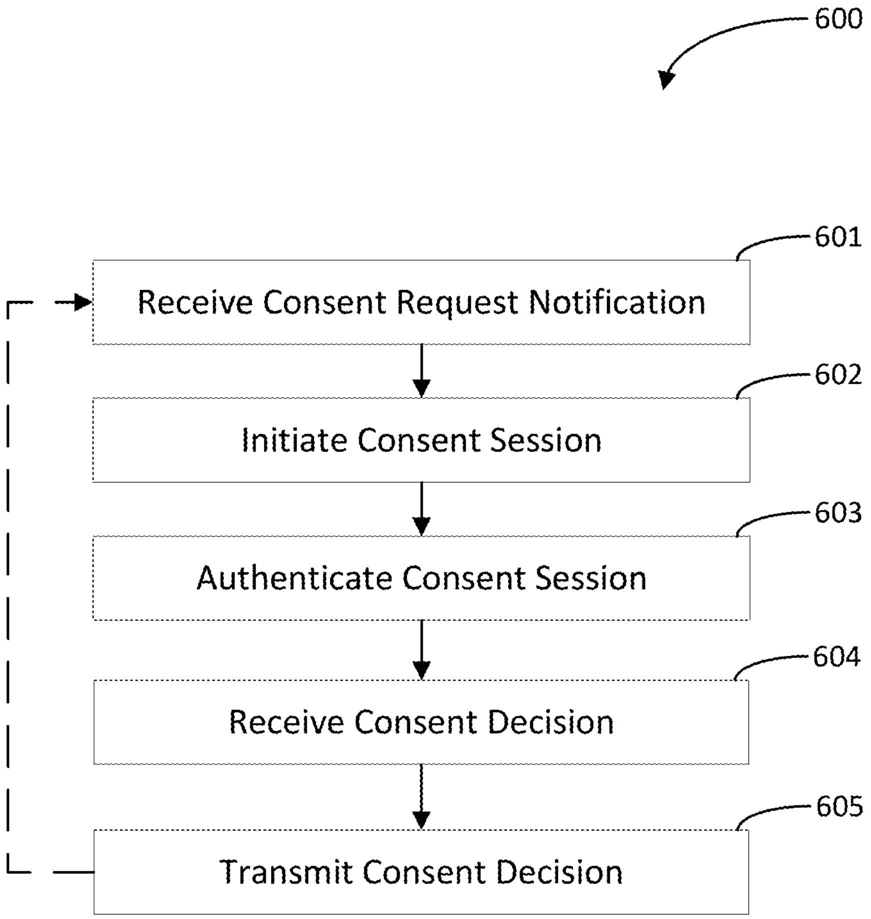
FIG. 6 is a flow diagram of a method for capturing a user's consent via a computing device of the user, according to another example embodiment.

Turning now to FIG. 6, a flow chart of a process 600 detailing the process of providing consent for a service via a mobile device is shown, according to an example embodiment. The process 600 may be performed by a mobile device, such as the mobile device 300 as described above.

At process 601, the mobile device 300 receives a consent request notification, such as the consent request notification 311 of FIG. 2. As discussed previously, the consent request notification 311 may be a text message, SMS message, push notification, email, or other such notification. The nature of the consent request notification 311 may depend on a number of factors, such as whether the customer is enrolled in online provider institution services, whether the customer has a customer client application 340 associated with the provider institution installed on the mobile device 300, or whether the customer has provided consent to text. As shown in FIG. 2, the consent request notification 311 may include a selectable link, such as the selectable link 311(*a*), that the customer may use to initiate the requested consent session. The consent request notification 311 may also include other identifying information to associate the notification with the provider institution session, such as information identifying the provider institution, the customer, the date or time, etc.

At process 602, the customer may begin the consent session by responding to the consent request notification 311. The selectable link 311(*a*) may be configured to open either (a) the customer client application 340 associated with the provider institution that is installed on the mobile device 300 or (b) a web browser on the mobile device 300 (e.g., an Internet browser). The selectable link 311(*a*) may be configured to automatically detect the presence of the customer client application 340 on the mobile device 300 upon selection, where the absence of the customer client application 340 may cause the mobile device 300 to initiate the consent session within a web browser. In some arrangements, the consent request notification 311 may be structured to initiate the consent session when the customer opens the consent request notification 311 itself, rather than requiring the customer to select a link. For example, if the provider institution computing system 110 and/or agent terminal 200 have previously determined that the customer is enrolled in online provider institution services and has the customer client application 340 installed on the mobile device 300, the customer's selection of the consent request notification 311 itself may initiate the consent session. In other words, the customer may not need to first select the consent request notification 311 and then select a link, such as the link 311(*a*), within the consent request notification 311 to begin the consent session.

In some embodiments, the selectable link 311(*a*) may be a longer, more secure link. Longer and more secure links may be of particular necessity in circumstances when the customer has not enrolled in online provider institution services (e.g., a relatively longer numeric, alpha, or alphanumeric string of characters). In such instances, the mobile device 300 associated with the customer has not yet been authenticated or associated with the customer. In order to prevent bad actors or individuals with malicious intent from breaching the provider institution computing system 110, mobile device 300, agent terminal 200, etc., the selectable link 311(*a*) may be contain a larger number of characters (e.g., 100 characters) than other links (e.g., 10 characters) to render the link more secure.

The consent request notification 311 of process 601 may be structured to expire after a certain predefined period of time. More particularly, the selectable link 311(*a*) of the consent request notification 311 may initiate the consent session if selected within, for example, ten minutes after having been received. If the selectable link 311(*a*) is not selected during that time, selectable link 311(*a*) may become broken such that selection of the selectable link 311(*a*) beyond the certain period of time will not launch the consent session. The expiration of the selectable link 311(*a*) after a certain period of time may bolster security of the consent capture system 100 to ensure that consent for certain account services and the review of sensitive account information is conducted under secure and controlled circumstances.

To further secure the consent session, the customer may be required to authenticate the consent session at process 603. As discussed above, the customer may be required to provide one or more forms of authentication information in order to access the mobile device 300 and/or consent display screen 312. In particular, the customer may be required to provide one or more authentication credential, such as username and password information, biometric information, two-factor authentication (2FA), etc. If the customer has already started an authenticated session within the customer client application 340 of the mobile device 300 and where the authenticated session is still active, the customer may not be required to provide additional authentication information. In such embodiments, the customer is already enrolled in online provider institution services (e.g., online banking services associated with a financial institution) and/or that the customer has previously provided authentication information to begin an authenticated session within the customer client application 340.

In some instances, such as when the customer is not enrolled in online or mobile banking services with the provider institution, the customer may be required to authenticate the consent session using some additional means, such as by using a code received from the agent operating the agent terminal 200. For example, because the mobile device 300 has not previously been associated with the customer in an earlier provider institution session or authenticated for use during a provider institution session, further authentication may be required. Such authentication may be achieved by requiring the customer to input an alphanumeric code or other character code into the mobile device. The code may be a unique code generated by the provider institution computing system 110 and/or agent terminal 200. In some embodiments, the agent may provide the code to the customer. For example, the agent may verbally communicate the code to the customer. In another embodiment, the code may be a QR code provided by the agent terminal 200 that, when scanned by the camera 319 of the mobile device, causes an authenticated consent session to launch in a web browser or in the client application 340, for example. In yet another embodiment, the code may be transmitted from the agent terminal 200 or a peripheral device communicably connected to the agent terminal 200 via an NFC tap or other near-field communication, whereby the customer taps the mobile device 300 against the agent terminal or peripheral device and receives the code from the agent terminal 200, for example. In some arrangements, the code may be associated with the customer and the provider institution session within the account information database 141, consent database 146, or customized visit summary database 151. Thus, the code may be used to initiate an authenticated consent session thereby limiting the applicability of consent sessions generally to improve security of the systems and methods described herein.

Once the customer has successfully authenticated the consent session, the mobile device 300 may be structured to receive a consent decision from the customer. Specifically, the mobile device 300 may display a consent display screen 312 after the consent session has been authenticated. As is shown in FIG. 3, the consent display screen 312 may include updated account information 313, a confirmation input icon 314, and a rejection input icon 315. Because the confirmation input icon 314 and rejection input icon 315 are communicably coupled to the input device 318 of the mobile device 300, the customer's selection of either input icon 314, 315 will provide an indication of the selection to the mobile device 300. In some arrangements, the customer may indicate consent via the consent display screen 312 using some other means, such as by providing an e-signature, providing the customer's initials with a touch-screen stylus, etc.

In response to receiving the consent decision, the mobile device 300 may transmit the consent decision to the provider institution computing system 110 and/or the agent terminal 200 via the network 105 at process 605. Upon transmitting the consent decision, the mobile device 300 may further be configured to display a confirmation display screen (i.e., splash page) indicating to the customer that the consent decision has been successfully transmitted via the customer client application 340. In another embodiment, the confirmation display screen may be a page created by the provider institution computing system 110 and provided to the mobile device 300 via a web browser where the web browser is accessible via a link contained in a SMS message, or text push notification, or otherwise.

As noted with reference to FIGS. 4 and 5, the consent capture system 100 may also be configured to generate and transmit a customized visit summary to the mobile device 300. For example, the provider institution computing system 110 may generate a customized visit summary after a customer concludes a provider institution session. Notably, the customized visit summary may include pertinent details regarding the provider institution session, including a record of the customer's consent decision as provided via the mobile device in process 600. The customized visit summary may be transmitted to the mobile device 300 as a push notification, via a link embedded within a text message, via a link embedded within an email message, via a message communicated within the customer client application 340, or otherwise. In some embodiments, the customer may be required to provide authentication information as in process 603 in order to view the customized visit summary.

While a record of the consent decision may be included within the customized visit summary, a record of the consent decision may separately be transmitted to the mobile device 300 after the customer's consent decision is transmitted in process 605. For example, the customer may receive a push notification confirming that the consent decision has been transmitted, stored in the consent database 146 of the provider institution computing system 110, etc. In some embodiments, the customer may receive an alert or notification within the customer client application 340 indicating that the consent decision has been captured. In some arrangements, the notification of the consent decision may include a selectable link that, when selected, will cause the mobile device 300 to display details about the consent decision or other account details associated with the consent decision.

With regard to records of the customer's consent decision, customized visit summary reports, information, documents, or otherwise, the records may be subject to various retention policies associated with the provider institution. For example, a notification provided to the mobile device 300 of a consent decision may include a selectable link that remains active for a certain period of time, such as one week. In such embodiments, the customer may only view the record of the consent decision via the selectable link within one week of receipt. Other record retention periods may apply to records stored within the databases 141, 146, and 151 of the provider institution computing system 110. In some arrangements, no records are stored locally on the agent terminal 200, but are instead only accessible from the databases 141, 146, 151 of the provider institution computing system 110 through the agent terminal 200 while they remain available in said databases.

Figure 7:
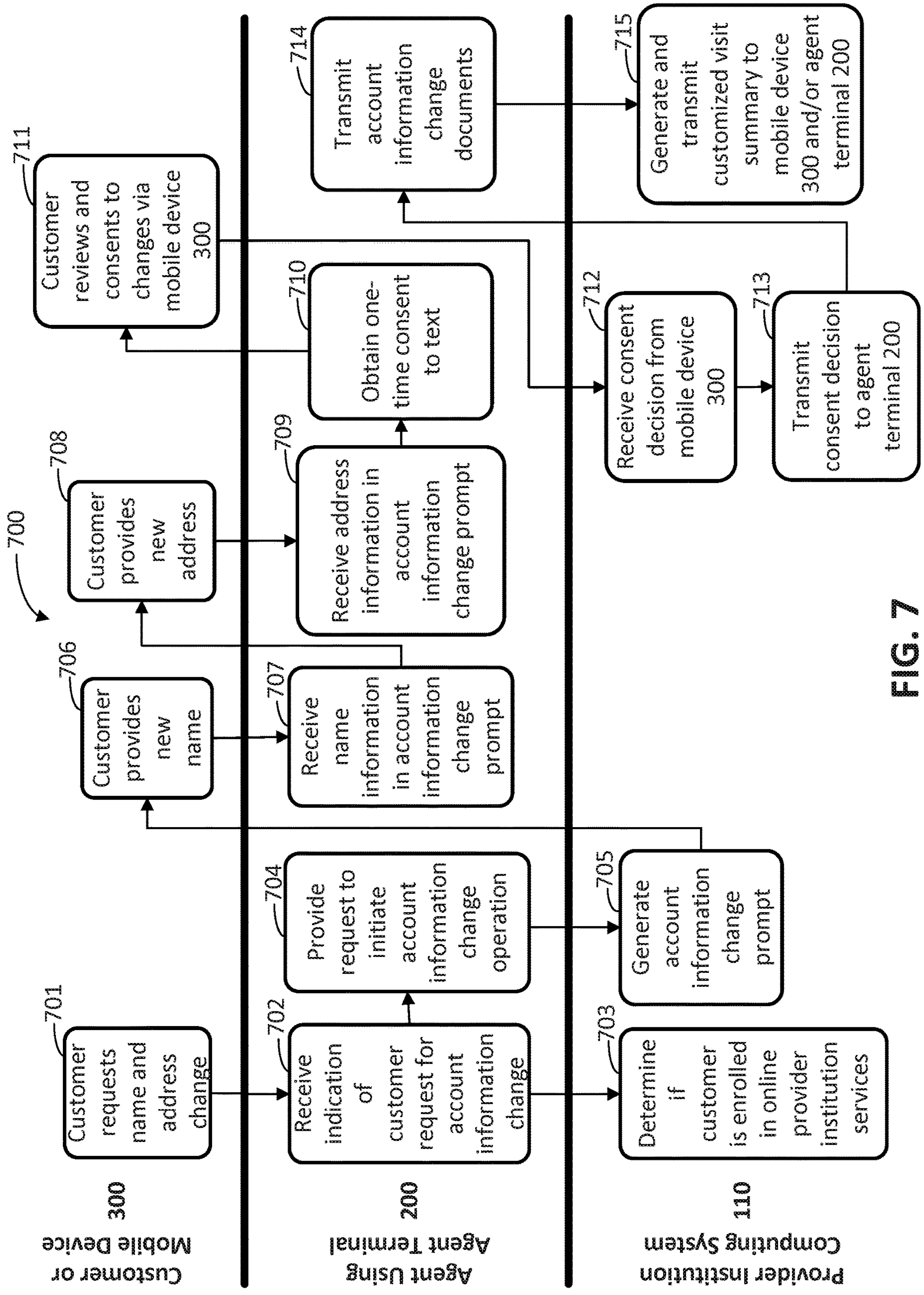
FIG. 7 is a flow diagram of a method for capturing a user's consent via a computing device of the user, according to another example embodiment.

Turning now to FIG. 7, a flow chart of a process 700 of a method of obtaining consent for an account change via a computing device is shown, according to an example embodiment. The process 700 may be performed by the consent capture system 100, or parts thereof, such that reference is made to the system 100 and certain components. In this regard and more particularly, the process 700 may be performed by a provider institution computing system, such as the provider institution computing system 110 as described above, an agent terminal, such as the agent terminal 200 as described above, and a mobile device, such as the mobile device 300 as described above.

At process 701, a customer within a physical branch location of the provider institution may, during a provider institution session, request an account information change, specifically a name and address change. At process 702, the agent terminal 200 receives an indication of the customer's request for an account information change, where the indication may be provided by the agent who is operating the agent terminal 200. The agent may provide such an indication by an input device of the agent terminal 200, for example, to the agent terminal client application that transmits the request/indication to the provider institution computing system 110. At process 703, the provider institution computing system 110 may determine if the customer has previously enrolled in online provider institution services, such as by creating an account for the customer client application 340 (e.g., online banking, etc.). At process 704, the agent terminal 200 may generate and provide a request to the provider institution computing system 110 to initiate an account information change operation. At process 705, the provider institution computing system 110 may generate an account information change prompt in response to receiving the request to initiate an account information change operation from the agent terminal 200. The account information change prompt may further be displayed on a display device of the agent terminal 200.

At process 706, the customer may provide an update name to the agent operating the agent terminal 200, such as by verbally communicating the information. At process 707, the agent terminal 200 may receive the updated name information from the agent operating the agent terminal 200 after the agent enters the updated name into the account information change prompt displayed on the agent terminal. At process 709, the customer may provide an updated address to the agent operating the agent terminal 200, such as by verbally communicating the information. At process 709, the agent terminal 200 may receive the update address information from the agent operating the agent terminal 200 after the agent enters the updated address into the account information change prompt displayed on the agent terminal 200. At process 710, the agent may obtain one-time consent to text mobile device 300 of the user, as described above with reference to process 503 of FIG. 5 where an indication of the one-time consent to text may be received by the agent terminal 200. At process 711, the customer reviews the updated account information which may be displayed on a consent display screen, such as the consent display screen 312, of the mobile device 300. The customer may then provide consent via the mobile device 300 by selecting a selectable icon, such as selectable input icons 314 and 315, to either affirmatively provide consent for the account information change or to withhold consent for the same. By selecting one of the selectable input icons 314, 315, the customer's consent decision (i.e. affirming or denying the account information change) is transmitted to the provider institution computing system 110.

At process 712, the provider institution computing system 110 may receive the consent decision from the mobile device 300. At process 713, the provider institution computing system 110 may transmit an indication of the consent decision to the agent terminal 200. At process 714, the agent may collect any account information change documents or other documents pertaining to the provider institution session, where the collected documents and information is transmitted to the provider institution computing system 110 via the agent terminal 200. At process 715, the provider institution computing system 110 may generate and transmit a customized visit summary document to the mobile device 300 and/or the agent terminal 200 based upon the consent decision provided at process 711 and the documents or information provided by the agent via the agent terminal 200 at process 714.

The consent capture system 100 described herein features a number of technical advantages. For example, the consent capture system 100 provides a convenient, contactless means for providing consent for various provider institution services without requiring customers of the provider institution to share a common, public device such as a PIN pad. This advantage reduces the risk of the spread of surface-borne infectious diseases. In addition, the consent capture system 100 includes location-matching functionality to confirm the presence of the mobile device 300 at or within a predetermined distance of a physical branch location of a provider institution. This advantage serves to bolster security by ensuring that the customer requesting certain services is physically present at the provider institution branch, which reduces risk that a bad actor will access or otherwise alter, revise, create, or modify account information of the customer. In addition, the mobile device 300 includes NFC tap capabilities and is configured to receive a code from the agent terminal 200 to securely authenticate a consent session, which has the advantage of bolstering security of the consent capture system 100 to further prevent opportunity for malicious actors to access the customer's sensitive account information.

While the disclosure herein references a provider institution, a provider institution session, and account information change services within the provider institution session, it will be appreciated that the disclosed concepts may also be used in other applications or industries. For example, the consent capture system 100 may also be used to obtain an individual's consent to terms and conditions associated with renting a car from a rental car company. Likewise, consent capture system 100 may also be used by guests checking into a hotel who may need to consent to various lodging rates, terms, conditions, etc. In some arrangements, the consent capture system 100 may permit a customer to confirm a food and beverage order while ordering food at a restaurant to ensure accuracy of said food order.

Moreover, in the context of provider institutions which include financial institutions, the consent capture system 100 may also be used to obtain a customer's consent for services within a provider institution session beyond changing account information. For example, the consent capture system 100 may also be used to obtain a customer's consent to agree to terms associated with an automobile loan, home equity loan, or various managed investment vehicles. In addition, the consent capture system 100 could be used to obtain a customer's consent to submit a credit card application or open a new account with the provider institution.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system for capturing consent via a mobile device, the system comprising:

an agent terminal located at a physical location associated with a provider institution; and a provider institution computing system associated with the provider institution, the provider institution computing system comprising a network interface and a processing circuit, the network interface structured to facilitate communication with the agent terminal and with a mobile device associated with a customer, the processing circuit comprising a processor and a memory, the processing circuit structured to:

receive, from the mobile device, location data and a token associated with the mobile device, the location data indicative of a real-time location of the mobile device;

determine, based on the received location data, that the mobile device is within a predetermined distance of the physical location;

determine, based on the token from the mobile device, that the customer is enrolled in an online service associated with the provider institution;

receive a request from the agent terminal to initiate a consent session for a customer, the consent session for an account information change pertaining to first data of the customer having an account associated with the online service, the first data to be changed identified by the agent terminal;

transmit a notification to the mobile device in response to the determination that the customer is enrolled in the online service and the determination that the mobile device is within the predetermined distance of the physical location, the notification configured to initiate the consent session with the mobile device;

receive authentication information from the mobile device associated with the customer, the authentication information associated with an active authenticated session of a native application of the mobile device and previously provided to initiate the active authenticated session of the native application;

authenticate the consent session with the mobile device based on the received authentication information and the active authenticated session of the native application;

generate and provide a consent display screen to the mobile device based on the authentication of the consent session, the consent display screen comprising the first data of the customer, wherein the first data of the customer is a selectively editable field to facilitate revision of the first data of the customer via the mobile device;

receive a consent decision from the mobile device, the consent decision comprising second data of the customer, the second data of the customer comprising revised first data of the customer based on an input via the selectively editable field;

store a record associated with the consent decision in a consent database, the stored record including the second data of the customer and the token; and transmit a customized visit summary to the mobile device, the customized visit summary comprising the record.

2. The computing system of claim 1, wherein the processing circuit is further structured to:

receive a request from the agent terminal to initiate an account information change regarding account information of the customer to change the second data of the customer.

3. The computing system of claim 2, wherein the processing circuit is further structured to:

generate, responsive to the request to initiate the account information change, a prompt comprising a second selectively editable field; and transmit the prompt to the agent terminal.

4. The computing system of claim 1, wherein the agent terminal is one of a plurality of agent terminals communicably coupled to the provider institution computing system.

5. The computing system of claim 1, wherein the token is associated with the native application, wherein the notification further comprises a selectable deep link, the selectable deep link configured to detect a presence of the native application on the mobile device based on a selection of the selectable deep link by identifying a resource associated with the native application on the mobile device and, responsive to detecting the presence of the native application, cause the native application to open.

6. The computing system of claim 5, wherein the selectable deep link expires after a certain period of time.

7. The computing system of claim 1, wherein the authentication information comprises an indication from the mobile device that the customer initiated the active authenticated session of the native application within a period of time, the native application associated with the provider institution computing system.

8. The computing system of claim 1, wherein the consent display screen further comprises a confirmation input icon and a rejection input icon, wherein the confirmation input icon and the rejection input icon are selectable via the mobile device.

9. A method of capturing consent via a mobile device, the method comprising:

receiving, by a provider institution computing system and from the mobile device, location data and a token associated with the mobile device, the location data indicative of a real-time location of the mobile device;

determining, by the provider institution computing system and based on the received location data, that the mobile device is within a predetermined distance of a physical location associated with a provider institution, wherein an agent terminal is located at the physical location;

determining, by a provider institution computing system associated with a provider institution and based on the token from the mobile device associated with a customer, that the customer is enrolled in an online service associated with the provider institution;

receiving, by the provider institution computing system, a request for a consent session from the agent terminal, the consent session for an account information change pertaining to first data of the customer having an account associated with the online service, the first data to be changed identified by the agent terminal;

transmitting, by the provider institution computing system, a notification to the mobile device in response to the determination that the customer is enrolled in the online service and the determination that the mobile device is within the predetermined distance of the physical location, the notification configured to initiate the consent session on the mobile device;

receiving, by the provider institution computing system, authentication information from the mobile device, the authentication information associated with the customer and an active authenticated session of a native application of the mobile device, the authentication information previously provided to initiate the active authenticated session of the native application;

authenticating the consent session on the mobile device based on the received authentication information and the active authenticated session of the native application;

presenting, by the provider institution computing system, a consent display screen on a display device of the mobile device based on the authentication of the consent session, the consent display screen comprising the first data of the customer, wherein the first data of the customer is provided as a selectively editable field to facilitate revision of the first data of the customer via the mobile device;

receiving, by the provider institution computing system, a consent decision from the mobile device, the consent decision comprising second data of the customer, the second data of the customer comprising revised first data of the customer based on an input via the selectively editable field;

storing, by the provider institution computing system, a record of the consent decision in a consent database, the stored record including the second data of the customer and the token; and transmitting, by the provider institution computing system, a customized visit summary to the mobile device, the customized visit summary comprising the record of the consent decision.

10. The method of claim 9, further comprising:

receiving, by the provider institution computing system, a request from the agent terminal to initiate an account information change to change the second data of the customer.

11. The method of claim 10, further comprising:

generating, by the provider institution computing system responsive to the request to initiate the account information change, a prompt comprising a second selectively editable field; and transmitting, by the provider institution computing system, the prompt to the agent terminal.

12. The method of claim 9, wherein the agent terminal is one of a plurality of agent terminals communicably coupled to the provider institution computing system.

13. The method of claim 9, wherein the token is associated with the native application, wherein the notification comprises a selectable deep link, the selectable deep link configured to detect a presence of the native application on the mobile device based on a selection of the selectable deep link by identifying a resource associated with the native application associated with the mobile device and, responsive to detecting the presence of the native application, cause the native application to open.

14. The method of claim 13, wherein the selectable deep link expires after a certain period of time.

15. The method of claim 9, wherein the authentication information comprises an indication from the mobile device that the customer initiated the active authenticated session of the native application within a period of time, the native application associated with the provider institution computing system.

16. A non-transitory computer readable medium having computer-executable instructions embodied therein that, when executed by at least one processor of a computing system associated with a provider institution, cause the computing system to perform operations to capture consent via a mobile device associated with a customer, the operations comprising:

receiving, from the mobile device, location data and a token associated with the mobile device, the location data indicative of a real-time location of the mobile device;

determining, based on the received location data, that the mobile device is within a predetermined distance of a physical location of an agent terminal, the physical location associated with a provider institution;

determining, based on the token received from the mobile device, that the customer is enrolled in an online service associated with the provider institution;

receiving a request for a consent session from the agent terminal, the consent session for an account information change pertaining to first data of the customer having an account associated with the online service, the first data to be changed identified by the agent terminal;

transmitting a notification to the mobile device associated with the customer in response to the determination that the customer is enrolled in the online service and the determination that the mobile device is within the predetermined distance of the physical location, the notification configured to initiate a consent session on the mobile device;

receiving authentication information from the mobile device, the authentication information associated with the customer and an active authenticated session of a native application of the mobile device, the authentication information previously provided to initiate the active authenticated session of the native application;

authenticating the consent session on the mobile device based on the received authentication information and the active authenticated session of the native application;

presenting a consent display screen via a display device of the mobile device based on the authentication of the consent session, the consent display screen comprising the first data of the customer, wherein the first data of the customer is provided as a selectively editable field to facilitate revision of the first data of the customer via the mobile device;

receiving a consent decision from the mobile device, the consent decision comprising second data of the customer, the second data of the customer comprising revised first data of the customer based on an input via the selectively editable field;

storing a record of the consent decision in a consent database, the stored record including the second data of the customer and the token; and transmitting a customized visit summary to the mobile device, the customized visit summary comprising the record.

17. The non-transitory computer readable medium of claim 16, the operations further comprising:

receiving a request from the agent terminal to initiate an account information change to change the second data of the customer.

18. The non-transitory computer readable medium of claim 17, the operations further comprising:

generating, responsive to the request to initiate the account information change, a prompt comprising a second selectively editable field; and transmitting the prompt to the agent terminal.

19. The non-transitory computer readable medium of claim 16, wherein the token is associated with the native application, wherein the notification comprises a selectable deep link, the selectable deep link configured to detect a presence of the native application on the mobile device based on a selection of the selectable deep link by identifying a resource associated with the native application on the mobile device and, responsive to detecting the presence of the native application, cause the native application to open.

20. The non-transitory computer readable medium of claim 19, wherein the selectable deep link expires after a certain period of time.

* * * * *